United States Patent
Kotte et al.

(10) Patent No.: US 10,114,557 B2
(45) Date of Patent: Oct. 30, 2018

(54) IDENTIFICATION OF HOT REGIONS TO ENHANCE PERFORMANCE AND ENDURANCE OF A NON-VOLATILE STORAGE DEVICE

(71) Applicant: SanDisk Enterprise IP LLC, Milpitas, CA (US)

(72) Inventors: Dharani Kotte, Fremont, CA (US); Akshay Mathur, Los Gatos, CA (US); Chayan Biswas, Newark, CA (US); Sumant K. Patro, Fremont, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/323,913

(22) Filed: Jul. 3, 2014

(65) Prior Publication Data

US 2015/0347029 A1 Dec. 3, 2015

Related U.S. Application Data

(60) Provisional application No. 62/005,423, filed on May 30, 2014.

(51) Int. Cl.
*G06F 12/00* (2006.01)
*G06F 3/06* (2006.01)
*G06F 11/00* (2006.01)

(52) U.S. Cl.
CPC .......... *G06F 3/0611* (2013.01); *G06F 3/0616* (2013.01); *G06F 3/0653* (2013.01);
(Continued)

(58) Field of Classification Search
CPC ....................................................... G06F 12/00
(Continued)

(56) References Cited

U.S. PATENT DOCUMENTS 4,173,737 A 11/1979 Skerlos et al.
4,888,750 A 12/1989 Kryder et al.
(Continued)

FOREIGN PATENT DOCUMENTS

CN 1701309 11/2005
CN 102385902 3/2012
(Continued)

OTHER PUBLICATIONS

Barr, "Introductlon to Watchdog Timers." Oct. 2001, 3 pgs.
(Continued)

*Primary Examiner* — Gautam Sain
(74) *Attorney, Agent, or Firm* — Morgan, Lewis & Bockius LLP

(57) ABSTRACT

Systems, methods and/or devices are used to enable identification of hot regions to enhance performance and endurance of a non-volatile storage device. In one aspect, the method includes (1) receiving a plurality of input/output (I/O) requests to be performed in a plurality of regions in a logical address space of a host, and (2) performing one or more operations for each region of the plurality of regions in the logical address space of the host, including (a) determining whether the region is accessed by the plurality of I/O requests more than a predetermined threshold number of times during a predetermined time period, (b) if so, marking the region with a hot region indicator, and (c) while the region is marked with the hot region indicator, identifying open blocks associated with the region, and marking each of the identified open blocks with a hot block indicator.

22 Claims, 10 Drawing Sheets

(52) U.S. Cl.
CPC .......... *G06F 3/0655* (2013.01); *G06F 3/0679* (2013.01); *G06F 3/0688* (2013.01); *G06F 11/00* (2013.01); *G06F 12/00* (2013.01)

(58) Field of Classification Search
USPC ...................................................... 711/103
See application file for complete search history.

(56) References Cited

U.S. PATENT DOCUMENTS

| | | | |
|---|---|---|---|
| 4,916,652 A | 4/1990 | Schwarz et al. | |
| 5,129,089 A | 7/1992 | Nielsen | |
| 5,270,979 A | 12/1993 | Harari et al. | |
| 5,329,491 A | 7/1994 | Brown et al. | |
| 5,381,528 A | 1/1995 | Brunelle | |
| 5,404,485 A | 4/1995 | Ban | |
| 5,488,702 A | 1/1996 | Byers et al. | |
| 5,519,847 A | 5/1996 | Fandrich et al. | |
| 5,530,705 A | 6/1996 | Malone | |
| 5,537,555 A | 7/1996 | Landry | |
| 5,551,003 A | 8/1996 | Mattson et al. | |
| 5,636,342 A | 6/1997 | Jeffries | |
| 5,657,332 A | 8/1997 | Auclair et al. | |
| 5,666,114 A | 9/1997 | Brodie et al. | |
| 5,708,849 A | 1/1998 | Coke et al. | |
| 5,765,185 A | 6/1998 | Lambrache et al. | |
| 5,890,193 A | 3/1999 | Chevallier | |
| 5,930,188 A | 7/1999 | Roohparvar | |
| 5,936,884 A | 8/1999 | Hasbun et al. | |
| 5,943,692 A | 8/1999 | Marberg et al. | |
| 5,946,714 A | 8/1999 | Miyauchi | |
| 5,982,664 A | 11/1999 | Watanabe | |
| 6,000,006 A | 12/1999 | Bruce et al. | |
| 6,006,345 A | 12/1999 | Berry, Jr. | |
| 6,016,560 A | 1/2000 | Wada et al. | |
| 6,018,304 A | 1/2000 | Bessios | |
| 6,044,472 A | 3/2000 | Crohas | |
| 6,070,074 A | 5/2000 | Perahia et al. | |
| 6,104,304 A | 8/2000 | Clark et al. | |
| 6,119,250 A | 9/2000 | Nishimura et al. | |
| 6,138,261 A | 10/2000 | Wilcoxson et al. | |
| 6,182,264 B1 | 1/2001 | Ott | |
| 6,192,092 B1 | 2/2001 | Dizon et al. | |
| 6,260,120 B1 | 7/2001 | Blumenau et al. | |
| 6,295,592 B1 | 9/2001 | Jeddeloh et al. | |
| 6,311,263 B1 | 10/2001 | Barlow et al. | |
| 6,324,543 B1 | 11/2001 | Cohen et al. | |
| 6,408,394 B1 | 6/2002 | Vander Kamp et al. | |
| 6,412,042 B1 | 6/2002 | Paterson et al. | |
| 6,442,076 B1 | 8/2002 | Roohparvar | |
| 6,449,625 B1 | 9/2002 | Wang | |
| 6,484,224 B1 | 11/2002 | Robins et al. | |
| 6,516,437 B1 | 2/2003 | Van Stralen et al. | |
| 6,564,285 B1 | 5/2003 | Mills et al. | |
| 6,647,387 B1 | 11/2003 | McKean et al. | |
| 6,675,258 B1 | 1/2004 | Bramhall et al. | |
| 6,678,788 B1 | 1/2004 | O'Connell | |
| 6,728,879 B1 | 4/2004 | Atkinson | |
| 6,757,768 B1 | 6/2004 | Potter et al. | |
| 6,775,792 B2 | 8/2004 | Ulrich et al. | |
| 6,810,440 B2 | 10/2004 | Micalizzi, Jr. et al. | |
| 6,836,808 B2 | 12/2004 | Bunce et al. | |
| 6,836,815 B1 | 12/2004 | Purcell et al. | |
| 6,842,436 B2 | 1/2005 | Moeller | |
| 6,865,650 B1 | 3/2005 | Morley et al. | |
| 6,871,257 B2 | 3/2005 | Conley et al. | |
| 6,895,464 B2 | 5/2005 | Chow et al. | |
| 6,934,755 B1 | 8/2005 | Saulpaugh et al. | |
| 6,966,006 B2 | 11/2005 | Pacheco et al. | |
| 6,978,343 B1 | 12/2005 | Ichiriu | |
| 6,980,985 B1 | 12/2005 | Amer-Yahia et al. | |
| 6,981,205 B2 | 12/2005 | Fukushima et al. | |
| 6,988,171 B2 | 1/2006 | Beardsley et al. | |
| 7,020,017 B2 | 3/2006 | Chen et al. | |
| 7,024,514 B2 | 4/2006 | Mukaida et al. | |
| 7,028,165 B2 | 4/2006 | Roth et al. | |
| 7,032,123 B2 | 4/2006 | Kane et al. | |
| 7,043,505 B1 | 5/2006 | Teague et al. | |
| 7,043,615 B1 | 5/2006 | Kobayashi et al. | |
| 7,076,598 B2 | 7/2006 | Wang | |
| 7,100,002 B2 | 8/2006 | Shrader et al. | |
| 7,102,860 B2 | 9/2006 | Wenzel | |
| 7,111,293 B1 | 9/2006 | Hersh et al. | |
| 7,126,873 B2 | 10/2006 | See et al. | |
| 7,133,282 B2 | 11/2006 | Sone | |
| 7,155,579 B1 | 12/2006 | Neils et al. | |
| 7,162,678 B2 | 1/2007 | Saliba | |
| 7,173,852 B2 | 2/2007 | Gorobets et al. | |
| 7,184,446 B2 | 2/2007 | Rashid et al. | |
| 7,212,440 B2 | 5/2007 | Gorobets | |
| 7,269,755 B2 | 9/2007 | Moshayedi et al. | |
| 7,275,170 B2 | 9/2007 | Suzuki | |
| 7,295,479 B2 | 11/2007 | Yoon et al. | |
| 7,328,377 B1 | 2/2008 | Lewis et al. | |
| 7,426,633 B2 | 9/2008 | Thompson et al. | |
| 7,486,561 B2 | 2/2009 | Mokhlesi | |
| 7,516,292 B2 | 4/2009 | Kimura et al. | |
| 7,523,157 B2 | 4/2009 | Aguilar, Jr. et al. | |
| 7,527,466 B2 | 5/2009 | Simmons | |
| 7,529,466 B2 | 5/2009 | Takahashi | |
| 7,533,214 B2 | 5/2009 | Aasheim et al. | |
| 7,546,478 B2 | 6/2009 | Kubo et al. | |
| 7,566,987 B2 | 7/2009 | Black et al. | |
| 7,571,277 B2 | 8/2009 | Mizushima | |
| 7,574,554 B2 | 8/2009 | Tanaka et al. | |
| 7,596,643 B2 | 9/2009 | Merry et al. | |
| 7,669,003 B2 | 2/2010 | Sinclair et al. | |
| 7,681,106 B2 | 3/2010 | Jarrar et al. | |
| 7,685,494 B1 | 3/2010 | Varnica et al. | |
| 7,707,481 B2 | 4/2010 | Kirschner et al. | |
| 7,761,655 B2 | 7/2010 | Mizushima et al. | |
| 7,765,454 B2 | 7/2010 | Passint | |
| 7,774,390 B2 | 8/2010 | Shin | |
| 7,809,836 B2 | 10/2010 | Mihm et al. | |
| 7,840,762 B2 | 11/2010 | Oh et al. | |
| 7,870,326 B2 | 1/2011 | Shin et al. | |
| 7,890,818 B2 | 2/2011 | Kong et al. | |
| 7,913,022 B1 | 3/2011 | Baxter | |
| 7,925,960 B2 | 4/2011 | Ho et al. | |
| 7,934,052 B2 | 4/2011 | Prins et al. | |
| 7,945,825 B2 | 5/2011 | Cohen et al. | |
| 7,954,041 B2 | 5/2011 | Hong et al. | |
| 7,971,112 B2 | 6/2011 | Murata | |
| 7,974,368 B2 | 7/2011 | Shieh et al. | |
| 7,975,108 B1 | 7/2011 | Holscher et al. | |
| 7,978,516 B2 | 7/2011 | Olbrich | |
| 7,996,642 B1 | 8/2011 | Smith | |
| 8,006,161 B2 | 8/2011 | Lestable et al. | |
| 8,032,724 B1 | 10/2011 | Smith | |
| 8,041,884 B2 | 10/2011 | Chang | |
| 8,042,011 B2 | 10/2011 | Nicolaidis et al. | |
| 8,069,390 B2 | 11/2011 | Lin | |
| 8,190,967 B2 | 5/2012 | Hong et al. | |
| 8,250,380 B2 | 8/2012 | Guyot | |
| 8,254,181 B2 | 8/2012 | Hwang et al. | |
| 8,259,506 B1 | 9/2012 | Sommer et al. | |
| 8,261,020 B2 | 9/2012 | Krishnaprasad et al. | |
| 8,312,349 B2 | 11/2012 | Reche et al. | |
| 8,385,117 B2 | 2/2013 | Sakurada et al. | |
| 8,412,985 B1 | 4/2013 | Bowers et al. | |
| 8,429,436 B2 | 4/2013 | Fillingim et al. | |
| 8,438,459 B2 | 5/2013 | Cho et al. | |
| 8,453,022 B2 | 5/2013 | Katz | |
| 8,473,680 B1 | 6/2013 | Pruthi | |
| 8,510,499 B1 | 8/2013 | Banerjee | |
| 8,531,888 B2 | 9/2013 | Chilappagari et al. | |
| 8,554,984 B2 | 10/2013 | Yano et al. | |
| 8,627,117 B2 | 1/2014 | Johnston | |
| 8,634,248 B1 | 1/2014 | Sprouse et al. | |
| 8,665,650 B2 | 3/2014 | Yang | |
| 8,694,854 B1 | 4/2014 | Dar et al. | |
| 8,700,842 B2 | 4/2014 | Dinker | |
| 8,724,789 B2 | 5/2014 | Altberg et al. | |
| 8,775,741 B1 | 7/2014 | de la Iglesia | |

(56) References Cited

U.S. PATENT DOCUMENTS

| | | |
|---|---|---|
| 8,788,778 B1 * | 7/2014 | Boyle .......... G06F 12/0253 711/155 |
| 8,832,384 B1 | 9/2014 | de la Iglesia |
| 8,849,825 B1 | 9/2014 | McHugh et al. |
| 8,874,992 B2 | 10/2014 | Desireddi et al. |
| 8,885,434 B2 | 11/2014 | Kumar |
| 8,898,373 B1 | 11/2014 | Kang et al. |
| 8,909,894 B1 | 12/2014 | Singh et al. |
| 8,910,030 B2 | 12/2014 | Goel |
| 8,923,066 B1 | 12/2014 | Subramanian et al. |
| 8,928,681 B1 | 1/2015 | Edmondson et al. |
| 9,002,805 B1 | 4/2015 | Barber et al. |
| 9,043,517 B1 | 5/2015 | Sprouse et al. |
| 9,052,942 B1 | 6/2015 | Barber et al. |
| 9,063,946 B1 | 6/2015 | Barber et al. |
| 9,110,843 B2 | 8/2015 | Chiu et al. |
| 9,128,690 B2 | 9/2015 | Lotzenburger et al. |
| 9,329,789 B1 | 5/2016 | Chu et al. |
| 9,355,060 B1 | 5/2016 | Barber et al. |
| 9,417,917 B1 | 8/2016 | Barber et al. |
| 2001/0026949 A1 | 10/2001 | Ogawa et al. |
| 2001/0050824 A1 | 12/2001 | Buch |
| 2002/0024846 A1 | 2/2002 | Kawahara et al. |
| 2002/0032891 A1 | 3/2002 | Yada et al. |
| 2002/0036515 A1 | 3/2002 | Eldridge et al. |
| 2002/0083299 A1 | 6/2002 | Van Huben et al. |
| 2002/0099904 A1 | 7/2002 | Conley |
| 2002/0116651 A1 | 8/2002 | Beckert et al. |
| 2002/0122334 A1 | 9/2002 | Lee et al. |
| 2002/0152305 A1 | 10/2002 | Jackson et al. |
| 2002/0165896 A1 | 10/2002 | Talagala et al. |
| 2003/0041299 A1 | 2/2003 | Kanazawa et al. |
| 2003/0043829 A1 | 3/2003 | Rashid |
| 2003/0079172 A1 | 4/2003 | Yamagishi et al. |
| 2003/0088805 A1 | 5/2003 | Majni et al. |
| 2003/0093628 A1 | 5/2003 | Matter et al. |
| 2003/0163594 A1 | 8/2003 | Aasheim et al. |
| 2003/0163629 A1 | 8/2003 | Conley et al. |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0204341 A1 | 10/2003 | Guliani et al. |
| 2003/0212719 A1 | 11/2003 | Yasuda et al. |
| 2003/0225961 A1 | 12/2003 | Chow et al. |
| 2004/0024957 A1 | 2/2004 | Lin et al. |
| 2004/0024963 A1 | 2/2004 | Talagala et al. |
| 2004/0057575 A1 | 3/2004 | Zhang et al. |
| 2004/0062157 A1 | 4/2004 | Kawabe |
| 2004/0073829 A1 | 4/2004 | Olarig |
| 2004/0085849 A1 | 5/2004 | Myoung et al. |
| 2004/0114265 A1 | 6/2004 | Talbert |
| 2004/0143710 A1 | 7/2004 | Walmsley |
| 2004/0148561 A1 | 7/2004 | Shen et al. |
| 2004/0153902 A1 | 8/2004 | Machado et al. |
| 2004/0158775 A1 | 8/2004 | Shibuya et al. |
| 2004/0167898 A1 | 8/2004 | Margolus et al. |
| 2004/0181734 A1 | 9/2004 | Saliba |
| 2004/0199714 A1 | 10/2004 | Estakhri et al. |
| 2004/0210706 A1 | 10/2004 | In et al. |
| 2004/0237018 A1 | 11/2004 | Riley |
| 2005/0060456 A1 | 3/2005 | Shrader et al. |
| 2005/0060501 A1 | 3/2005 | Shrader |
| 2005/0073884 A1 | 4/2005 | Gonzalez et al. |
| 2005/0108588 A1 | 5/2005 | Yuan |
| 2005/0114587 A1 | 5/2005 | Chou et al. |
| 2005/0138442 A1 | 6/2005 | Keller, Jr. et al. |
| 2005/0144358 A1 | 6/2005 | Conley et al. |
| 2005/0144361 A1 | 6/2005 | Gonzalez et al. |
| 2005/0144367 A1 | 6/2005 | Sinclair |
| 2005/0144516 A1 | 6/2005 | Gonzalez et al. |
| 2005/0154825 A1 | 7/2005 | Fair |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0210348 A1 | 9/2005 | Totsuka |
| 2005/0231765 A1 | 10/2005 | So et al. |
| 2005/0249013 A1 | 11/2005 | Janzen et al. |
| 2005/0251617 A1 | 11/2005 | Sinclair et al. |
| 2005/0257120 A1 | 11/2005 | Gorobets et al. |
| 2005/0273560 A1 | 12/2005 | Hulbert et al. |
| 2005/0281088 A1 | 12/2005 | Ishidoshiro et al. |
| 2005/0289314 A1 | 12/2005 | Adusumilli et al. |
| 2006/0010174 A1 | 1/2006 | Nguyen et al. |
| 2006/0039196 A1 | 2/2006 | Gorobets et al. |
| 2006/0039227 A1 | 2/2006 | Lai et al. |
| 2006/0053246 A1 | 3/2006 | Lee |
| 2006/0062054 A1 | 3/2006 | Hamilton et al. |
| 2006/0069932 A1 | 3/2006 | Oshikawa et al. |
| 2006/0085671 A1 | 4/2006 | Majni et al. |
| 2006/0087893 A1 | 4/2006 | Nishihara et al. |
| 2006/0103480 A1 | 5/2006 | Moon et al. |
| 2006/0107181 A1 | 5/2006 | Dave et al. |
| 2006/0136570 A1 | 6/2006 | Pandya |
| 2006/0136655 A1 | 6/2006 | Gorobets et al. |
| 2006/0136681 A1 | 6/2006 | Jain et al. |
| 2006/0156177 A1 | 7/2006 | Kottapalli et al. |
| 2006/0184738 A1 | 8/2006 | Bridges et al. |
| 2006/0195650 A1 | 8/2006 | Su et al. |
| 2006/0209592 A1 | 9/2006 | Li et al. |
| 2006/0224841 A1 | 10/2006 | Terai et al. |
| 2006/0244049 A1 | 11/2006 | Yaoi et al. |
| 2006/0259528 A1 | 11/2006 | Dussud et al. |
| 2006/0265568 A1 | 11/2006 | Burton |
| 2006/0291301 A1 | 12/2006 | Ziegelmayer |
| 2007/0011413 A1 | 1/2007 | Nonaka et al. |
| 2007/0033376 A1 | 2/2007 | Sinclair et al. |
| 2007/0058446 A1 | 3/2007 | Hwang et al. |
| 2007/0061597 A1 | 3/2007 | Holtzman et al. |
| 2007/0076479 A1 | 4/2007 | Kim et al. |
| 2007/0081408 A1 | 4/2007 | Kwon et al. |
| 2007/0083697 A1 | 4/2007 | Birrell et al. |
| 2007/0088716 A1 | 4/2007 | Brumme et al. |
| 2007/0091677 A1 | 4/2007 | Lasser et al. |
| 2007/0101096 A1 | 5/2007 | Gorobets |
| 2007/0106679 A1 | 5/2007 | Perrin et al. |
| 2007/0113019 A1 | 5/2007 | Beukema |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0156842 A1 | 7/2007 | Vermeulen et al. |
| 2007/0157064 A1 | 7/2007 | Falik et al. |
| 2007/0174579 A1 | 7/2007 | Shin |
| 2007/0180188 A1 | 8/2007 | Fujibayashi et al. |
| 2007/0180346 A1 | 8/2007 | Murin |
| 2007/0191993 A1 | 8/2007 | Wyatt |
| 2007/0201274 A1 | 8/2007 | Yu et al. |
| 2007/0204128 A1 | 8/2007 | Lee et al. |
| 2007/0208901 A1 | 9/2007 | Purcell et al. |
| 2007/0234143 A1 | 10/2007 | Kim |
| 2007/0245061 A1 | 10/2007 | Harriman |
| 2007/0245099 A1 | 10/2007 | Gray et al. |
| 2007/0263442 A1 | 11/2007 | Cornwall et al. |
| 2007/0268754 A1 | 11/2007 | Lee et al. |
| 2007/0277036 A1 | 11/2007 | Chamberlain et al. |
| 2007/0279988 A1 | 12/2007 | Nguyen |
| 2007/0291556 A1 | 12/2007 | Kamei |
| 2007/0294496 A1 | 12/2007 | Goss et al. |
| 2007/0300130 A1 | 12/2007 | Gorobets |
| 2008/0005475 A1 | 1/2008 | Lubbers et al. |
| 2008/0013390 A1 | 1/2008 | Zipprich-Rasch |
| 2008/0019182 A1 | 1/2008 | Yanagidaira et al. |
| 2008/0022163 A1 | 1/2008 | Tanaka et al. |
| 2008/0028275 A1 | 1/2008 | Chen et al. |
| 2008/0043871 A1 | 2/2008 | Latouche et al. |
| 2008/0052446 A1 | 2/2008 | Lasser et al. |
| 2008/0052451 A1 | 2/2008 | Pua et al. |
| 2008/0056005 A1 | 3/2008 | Aritome |
| 2008/0059602 A1 | 3/2008 | Matsuda et al. |
| 2008/0071971 A1 | 3/2008 | Kim et al. |
| 2008/0077841 A1 | 3/2008 | Gonzalez et al. |
| 2008/0077937 A1 | 3/2008 | Shin et al. |
| 2008/0086677 A1 | 4/2008 | Yang et al. |
| 2008/0112226 A1 | 5/2008 | Mokhlesi |

(56) References Cited

U.S. PATENT DOCUMENTS

| | | |
|---|---|---|
| 2008/0141043 A1 | 6/2008 | Flynn et al. |
| 2008/0144371 A1 | 6/2008 | Yeh et al. |
| 2008/0147714 A1 | 6/2008 | Breternitz et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168191 A1 | 7/2008 | Biran et al. |
| 2008/0168319 A1 | 7/2008 | Lee et al. |
| 2008/0170460 A1 | 7/2008 | Oh et al. |
| 2008/0180084 A1 | 7/2008 | Dougherty et al. |
| 2008/0201661 A1 | 8/2008 | Haynes et al. |
| 2008/0209282 A1 | 8/2008 | Lee et al. |
| 2008/0229000 A1 | 9/2008 | Kim |
| 2008/0229003 A1 | 9/2008 | Mizushima et al. |
| 2008/0229176 A1 | 9/2008 | Arnez et al. |
| 2008/0270680 A1 | 10/2008 | Chang |
| 2008/0282128 A1 | 11/2008 | Lee et al. |
| 2008/0285351 A1 | 11/2008 | Shlick et al. |
| 2008/0313132 A1 | 12/2008 | Hao et al. |
| 2008/0320110 A1 | 12/2008 | Pathak |
| 2008/0320203 A1 | 12/2008 | Fitzgerald |
| 2009/0003046 A1 | 1/2009 | Nirschl et al. |
| 2009/0003058 A1 | 1/2009 | Kang |
| 2009/0019216 A1 | 1/2009 | Yamada et al. |
| 2009/0031083 A1 | 1/2009 | Willis et al. |
| 2009/0037652 A1 | 2/2009 | Yu et al. |
| 2009/0070608 A1 | 3/2009 | Kobayashi |
| 2009/0116283 A1 | 5/2009 | Ha et al. |
| 2009/0125671 A1 | 5/2009 | Flynn et al. |
| 2009/0144598 A1 | 6/2009 | Yoon et al. |
| 2009/0158288 A1 | 6/2009 | Fulton et al. |
| 2009/0168525 A1 | 7/2009 | Olbrich et al. |
| 2009/0172258 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0193058 A1 | 7/2009 | Reid |
| 2009/0204823 A1 | 8/2009 | Giordano et al. |
| 2009/0207660 A1 | 8/2009 | Hwang et al. |
| 2009/0213649 A1 | 8/2009 | Takahashi et al. |
| 2009/0222708 A1 | 9/2009 | Yamaga |
| 2009/0228761 A1 | 9/2009 | Perlmutter et al. |
| 2009/0235128 A1 | 9/2009 | Eun et al. |
| 2009/0249160 A1 | 10/2009 | Gao et al. |
| 2009/0251962 A1 | 10/2009 | Yun et al. |
| 2009/0268521 A1 | 10/2009 | Ueno et al. |
| 2009/0292972 A1 | 11/2009 | Seol et al. |
| 2009/0296466 A1 | 12/2009 | Kim et al. |
| 2009/0296486 A1 | 12/2009 | Kim et al. |
| 2009/0310422 A1 | 12/2009 | Edahiro et al. |
| 2009/0319864 A1 | 12/2009 | Shrader |
| 2010/0002506 A1 | 1/2010 | Cho et al. |
| 2010/0008175 A1 | 1/2010 | Sweere et al. |
| 2010/0011261 A1 | 1/2010 | Cagno et al. |
| 2010/0020620 A1 | 1/2010 | Kim et al. |
| 2010/0037012 A1 | 2/2010 | Yano et al. |
| 2010/0054034 A1 | 3/2010 | Furuta et al. |
| 2010/0061151 A1 | 3/2010 | Miwa et al. |
| 2010/0091535 A1 | 4/2010 | Sommer et al. |
| 2010/0103737 A1 | 4/2010 | Park |
| 2010/0110798 A1 | 5/2010 | Hoei et al. |
| 2010/0115206 A1 | 5/2010 | de la Iglesia et al. |
| 2010/0118608 A1 | 5/2010 | Song et al. |
| 2010/0138592 A1 | 6/2010 | Cheon |
| 2010/0153616 A1 | 6/2010 | Garratt |
| 2010/0161936 A1 | 6/2010 | Royer et al. |
| 2010/0174959 A1 | 7/2010 | No et al. |
| 2010/0185807 A1 | 7/2010 | Meng et al. |
| 2010/0199027 A1 | 8/2010 | Pucheral et al. |
| 2010/0199125 A1 | 8/2010 | Reche |
| 2010/0199138 A1 | 8/2010 | Rho |
| 2010/0202196 A1 | 8/2010 | Lee et al. |
| 2010/0202239 A1 | 8/2010 | Moshayedi et al. |
| 2010/0208521 A1 | 8/2010 | Kim et al. |
| 2010/0257379 A1 | 10/2010 | Wang et al. |
| 2010/0262889 A1 | 10/2010 | Bains |
| 2010/0281207 A1 | 11/2010 | Miller et al. |
| 2010/0281342 A1 | 11/2010 | Chang et al. |
| 2010/0306222 A1 | 12/2010 | Freedman et al. |
| 2010/0332858 A1 | 12/2010 | Trantham et al. |
| 2010/0332863 A1 | 12/2010 | Johnston |
| 2011/0010514 A1 | 1/2011 | Benhase et al. |
| 2011/0022779 A1 | 1/2011 | Lund et al. |
| 2011/0022819 A1 | 1/2011 | Post et al. |
| 2011/0026159 A1 | 2/2011 | Tsai et al. |
| 2011/0051513 A1 | 3/2011 | Shen et al. |
| 2011/0066597 A1 | 3/2011 | Mashtizadeh et al. |
| 2011/0066806 A1 | 3/2011 | Chhugani et al. |
| 2011/0072207 A1 | 3/2011 | Jin et al. |
| 2011/0072302 A1 | 3/2011 | Sartore |
| 2011/0078407 A1 | 3/2011 | Lewis |
| 2011/0078496 A1 | 3/2011 | Jeddeloh |
| 2011/0083060 A1 | 4/2011 | Sakurada et al. |
| 2011/0099460 A1 | 4/2011 | Dusija et al. |
| 2011/0113281 A1 | 5/2011 | Zhang et al. |
| 2011/0122691 A1 | 5/2011 | Sprouse |
| 2011/0126046 A1 | 5/2011 | Hoang |
| 2011/0131444 A1 | 6/2011 | Buch et al. |
| 2011/0138260 A1 | 6/2011 | Savin |
| 2011/0173378 A1 | 7/2011 | Filor et al. |
| 2011/0179249 A1 | 7/2011 | Hsiao |
| 2011/0199825 A1 | 8/2011 | Han et al. |
| 2011/0205823 A1 | 8/2011 | Hemink et al. |
| 2011/0213920 A1 | 9/2011 | Frost et al. |
| 2011/0222342 A1 | 9/2011 | Yoon et al. |
| 2011/0225346 A1 | 9/2011 | Goss et al. |
| 2011/0225347 A1* | 9/2011 | Goss ............... G06F 12/0246 711/103 |
| 2011/0228601 A1 | 9/2011 | Olbrich et al. |
| 2011/0231600 A1 | 9/2011 | Tanaka et al. |
| 2011/0239077 A1 | 9/2011 | Bai et al. |
| 2011/0264843 A1* | 10/2011 | Haines ............... G06F 12/0246 711/103 |
| 2011/0271040 A1 | 11/2011 | Kamizono |
| 2011/0283119 A1 | 11/2011 | Szu et al. |
| 2011/0289125 A1 | 11/2011 | Guthery |
| 2011/0320733 A1 | 12/2011 | Sanford et al. |
| 2012/0011393 A1 | 1/2012 | Roberts et al. |
| 2012/0017053 A1 | 1/2012 | Yang et al. |
| 2012/0023144 A1 | 1/2012 | Rub |
| 2012/0026799 A1 | 2/2012 | Lee |
| 2012/0054414 A1 | 3/2012 | Tsai et al. |
| 2012/0063234 A1 | 3/2012 | Shiga et al. |
| 2012/0072639 A1 | 3/2012 | Goss et al. |
| 2012/0096217 A1 | 4/2012 | Son et al. |
| 2012/0110250 A1 | 5/2012 | Sabbag et al. |
| 2012/0117317 A1 | 5/2012 | Sheffler |
| 2012/0117397 A1 | 5/2012 | Kolvick et al. |
| 2012/0124273 A1 | 5/2012 | Goss et al. |
| 2012/0131286 A1 | 5/2012 | Faith et al. |
| 2012/0151124 A1 | 6/2012 | Baek et al. |
| 2012/0151253 A1 | 6/2012 | Horn |
| 2012/0151294 A1 | 6/2012 | Yoo et al. |
| 2012/0173797 A1 | 7/2012 | Shen |
| 2012/0173826 A1 | 7/2012 | Takaku |
| 2012/0185750 A1 | 7/2012 | Hayami |
| 2012/0195126 A1 | 8/2012 | Roohparvar |
| 2012/0203804 A1 | 8/2012 | Burka et al. |
| 2012/0203951 A1 | 8/2012 | Wood et al. |
| 2012/0210095 A1 | 8/2012 | Nellans et al. |
| 2012/0216079 A1 | 8/2012 | Fai et al. |
| 2012/0233391 A1 | 9/2012 | Frost et al. |
| 2012/0236658 A1 | 9/2012 | Byom et al. |
| 2012/0239858 A1 | 9/2012 | Melik-Martirosian |
| 2012/0239868 A1 | 9/2012 | Ryan et al. |
| 2012/0239976 A1 | 9/2012 | Cometti et al. |
| 2012/0246204 A1 | 9/2012 | Nalla et al. |
| 2012/0259863 A1 | 10/2012 | Bodwin et al. |
| 2012/0275466 A1 | 11/2012 | Bhadra et al. |

(56) References Cited

U.S. PATENT DOCUMENTS

| | | |
|---|---|---|
| 2012/0278564 A1 | 11/2012 | Goss et al. |
| 2012/0284574 A1 | 11/2012 | Avila et al. |
| 2012/0284587 A1 | 11/2012 | Yu et al. |
| 2012/0297122 A1* | 11/2012 | Gorobets ............ G06F 12/0246 711/103 |
| 2013/0007073 A1 | 1/2013 | Varma |
| 2013/0007343 A1 | 1/2013 | Rub et al. |
| 2013/0007381 A1 | 1/2013 | Palmer |
| 2013/0007543 A1 | 1/2013 | Goss et al. |
| 2013/0024735 A1 | 1/2013 | Chung et al. |
| 2013/0031438 A1 | 1/2013 | Hu et al. |
| 2013/0036418 A1 | 2/2013 | Yadappanavar et al. |
| 2013/0038380 A1 | 2/2013 | Cordero et al. |
| 2013/0047045 A1 | 2/2013 | Hu et al. |
| 2013/0058145 A1 | 3/2013 | Yu et al. |
| 2013/0070527 A1 | 3/2013 | Sabbag et al. |
| 2013/0073784 A1 | 3/2013 | Ng et al. |
| 2013/0073798 A1 | 3/2013 | Kang et al. |
| 2013/0073924 A1 | 3/2013 | D'Abreu et al. |
| 2013/0079942 A1 | 3/2013 | Smola et al. |
| 2013/0086131 A1 | 4/2013 | Hunt et al. |
| 2013/0086132 A1 | 4/2013 | Hunt et al. |
| 2013/0094288 A1 | 4/2013 | Patapoutian et al. |
| 2013/0103978 A1 | 4/2013 | Akutsu |
| 2013/0110891 A1 | 5/2013 | Ogasawara et al. |
| 2013/0111279 A1 | 5/2013 | Jeon et al. |
| 2013/0111298 A1 | 5/2013 | Seroff et al. |
| 2013/0117606 A1 | 5/2013 | Anholt et al. |
| 2013/0121084 A1 | 5/2013 | Jeon et al. |
| 2013/0124792 A1 | 5/2013 | Melik-Martirosian et al. |
| 2013/0124888 A1 | 5/2013 | Tanaka et al. |
| 2013/0128666 A1 | 5/2013 | Avila et al. |
| 2013/0132647 A1 | 5/2013 | Melik-Martirosian |
| 2013/0132652 A1 | 5/2013 | Wood et al. |
| 2013/0159597 A1* | 6/2013 | Cheong ............... G06F 12/0638 711/102 |
| 2013/0159609 A1 | 6/2013 | Haas et al. |
| 2013/0166824 A1* | 6/2013 | Shim .................. G06F 12/0246 711/103 |
| 2013/0176784 A1 | 7/2013 | Cometti et al. |
| 2013/0179646 A1 | 7/2013 | Okubo et al. |
| 2013/0191601 A1 | 7/2013 | Peterson et al. |
| 2013/0194865 A1 | 8/2013 | Bandic et al. |
| 2013/0194874 A1 | 8/2013 | Mu et al. |
| 2013/0232289 A1 | 9/2013 | Zhong et al. |
| 2013/0238576 A1 | 9/2013 | Binkert et al. |
| 2013/0254498 A1 | 9/2013 | Adachi et al. |
| 2013/0254507 A1 | 9/2013 | Islam et al. |
| 2013/0258738 A1 | 10/2013 | Barkon et al. |
| 2013/0265838 A1 | 10/2013 | Li |
| 2013/0282955 A1 | 10/2013 | Parker et al. |
| 2013/0290611 A1 | 10/2013 | Biederman et al. |
| 2013/0297613 A1 | 11/2013 | Yu |
| 2013/0301373 A1 | 11/2013 | Tam |
| 2013/0304980 A1 | 11/2013 | Nachimuthu et al. |
| 2013/0314988 A1 | 11/2013 | Desireddi et al. |
| 2013/0343131 A1 | 12/2013 | Wu et al. |
| 2013/0346672 A1 | 12/2013 | Sengupta et al. |
| 2014/0013027 A1 | 1/2014 | Jannyavula Venkata et al. |
| 2014/0013188 A1 | 1/2014 | Wu et al. |
| 2014/0019707 A1 | 1/2014 | Benhase et al. |
| 2014/0025864 A1* | 1/2014 | Zhang ................. G06F 12/0246 711/103 |
| 2014/0032837 A1 | 1/2014 | Nagasaki et al. |
| 2014/0032890 A1 | 1/2014 | Lee et al. |
| 2014/0052928 A1 | 2/2014 | Shimoi |
| 2014/0063905 A1 | 3/2014 | Ahn et al. |
| 2014/0067761 A1 | 3/2014 | Chakrabarti et al. |
| 2014/0071761 A1 | 3/2014 | Sharon et al. |
| 2014/0075133 A1 | 3/2014 | Li et al. |
| 2014/0082261 A1 | 3/2014 | Cohen et al. |
| 2014/0082310 A1 | 3/2014 | Nakajima |
| 2014/0082456 A1 | 3/2014 | Li et al. |
| 2014/0082459 A1 | 3/2014 | Li et al. |
| 2014/0095775 A1 | 4/2014 | Talagala et al. |
| 2014/0101389 A1 | 4/2014 | Nellans et al. |
| 2014/0115238 A1 | 4/2014 | Xi et al. |
| 2014/0122818 A1 | 5/2014 | Hayasaka et al. |
| 2014/0122907 A1 | 5/2014 | Johnston |
| 2014/0136762 A1 | 5/2014 | Li et al. |
| 2014/0136883 A1 | 5/2014 | Cohen |
| 2014/0136927 A1 | 5/2014 | Li et al. |
| 2014/0143505 A1 | 5/2014 | Sim et al. |
| 2014/0153333 A1 | 6/2014 | Avila et al. |
| 2014/0157065 A1 | 6/2014 | Ong |
| 2014/0173224 A1 | 6/2014 | Fleischer et al. |
| 2014/0181458 A1* | 6/2014 | Loh ..................... G06F 12/1027 711/206 |
| 2014/0201596 A1 | 7/2014 | Baum et al. |
| 2014/0223084 A1 | 8/2014 | Lee et al. |
| 2014/0244578 A1 | 8/2014 | Winkelstraeter |
| 2014/0258755 A1 | 9/2014 | Stenfort |
| 2014/0269090 A1 | 9/2014 | Flynn et al. |
| 2014/0279909 A1 | 9/2014 | Sudarsanam et al. |
| 2014/0310494 A1 | 10/2014 | Higgins et al. |
| 2014/0359044 A1 | 12/2014 | Davis et al. |
| 2014/0359381 A1 | 12/2014 | Takeuchi et al. |
| 2015/0023097 A1 | 1/2015 | Khoueir et al. |
| 2015/0032967 A1 | 1/2015 | Udayashankar et al. |
| 2015/0037624 A1 | 2/2015 | Thompson et al. |
| 2015/0153799 A1 | 6/2015 | Lucas et al. |
| 2015/0153802 A1 | 6/2015 | Lucas et al. |
| 2015/0212943 A1 | 7/2015 | Yang et al. |
| 2015/0268879 A1 | 9/2015 | Chu |
| 2015/0286438 A1 | 10/2015 | Simionescu et al. |

FOREIGN PATENT DOCUMENTS

| | | |
|---|---|---|
| EP | 1 299 800 | 4/2003 |
| EP | 1 465 203 A1 | 10/2004 |
| EP | 1 990 921 A2 | 11/2008 |
| EP | 2 386 958 A1 | 11/2011 |
| EP | 2 620 946 A2 | 7/2013 |
| JP | 2002-532806 | 10/2002 |
| WO | WO 2007/036834 | 4/2007 |
| WO | WO 2007/080586 | 7/2007 |
| WO | WO 2008/075292 A2 | 6/2008 |
| WO | WO 2008/121553 | 10/2008 |
| WO | WO 2008/121577 | 10/2008 |
| WO | WO 2009/028281 | 3/2009 |
| WO | WO 2009/032945 | 3/2009 |
| WO | WO 2009/058140 | 3/2009 |
| WO | WO 2009/084724 | 7/2009 |
| WO | WO 2009/134576 | 11/2009 |
| WO | WO 2011/024015 | 3/2011 |
| WO | WO 2013/101573 | 7/2013 |

OTHER PUBLICATIONS

Canim "Buffered Bloom Filters on Solid State Storage," ADMS*10, Singapore, Sep. 13-17, 2010, 8 pgs.
Kang, "A Multi-Channel Architecture for High-Performance NAND Flash-Based Storage System," J. Syst. Archit., vol. 53, Issue 9, Sep. 2007, 15 pgs.
Kim, "A Space-Efficient Flash Translation Layer for CompactFlash Systems," May 2002, IEEE vol. 48, No. 2, 10 pgs.
Lu, "A Forest-structured Bloom Filter with Flash Memory," MSST 2011, Denver, CO, May 23-27, 2011, article, 6 pgs.
Lu, "A Forest-structured Bicom Filter with Flash Memory," MSST 2011, Denver, CO, May 23-27, 2011, presentation slides:, 25 pgs.
McLean, "Information Technology—AT Attachment with Packet Interface Extension." Aug. 19, 1998, 339 pgs.
Microchip Technology, "Section 10. Watchdog Timer and Power-Saving Modes" 2005, 14 pages.
Park et al., "A High Performance Controller for NAND Flash-Based Solid State Disk (NSSD)," Proceedings of Non-Volatile Semiconductor Memory Workshop, Feb. 2006, 4 pgs.
Zeidman. "Verlog Designer's Library," 1999, 9 pgs.
International Search Report and Written Opinion, dated Mar. 19, 2009 received in International Patent Application No. PCT/US08/88133, which corresponds to U.S. Appl. No. 12/082,202, 7 pgs (Prins).

(56) References Cited

OTHER PUBLICATIONS

International Search Report and Written Opinion, dated Mar. 19, 2009, received in International Patent Application No. PCT/US08/88136, which corresponds to U.S. Appl. No. 12/082,205; 7 pgs (Olbrich).
International Search Report and Written Opinion dated Feb. 26, 2009, received in International Patent Application No. PCT/US08/88146, which corresponds to U.S. Appl. No. 12/082,221, 10 pgs (Prins).
International Search Report and Written Opinion dated Feb. 27, 2009, received in International Patent Application No. PCT/US2008/088154, which corresponds to U.S. Appl. No. 12/082,207, 8 pgs (Prins).
International Search Report and Written Opinion dated Feb. 17, 2009, received in International Patent Application No. PCT/US08/88154, which corresponds to U.S. Appl. No. 12/082,220, 6 pgs (Olbrich).
International Search Report and Written Opinion dated Feb. 18, 2009, received in International Patent Application No. PCT/US08/88206, which corresponds to U.S. Appl. No. 12/082,206, 8 pgs (Prins).
International Search Report and Written Opinion dated Feb. 19, 2009, received in International Patent Application No. PCT/US08/088217, which corresponds to U.S. Appl. No. 12/082,204, 7 pgs (Olbrich).
International Search Report and Written Opinion dated Feb. 13, 2009, received in International Patent Application No. PCT/US08/88229, which corresponds to U.S. Appl. No. 12/082,223, 2 pgs (Olbrich).
International Search Report and Written Opinion dated Feb. 19, 2009, received in International Patent Application No. PCT/US08/88232, which corresponds to U.S. Appl. No. 12/082,222, 8 pgs (Olbrich).
International Search Report and Written Opinion dated Feb. 19, 2009, received in International Patent Application No. PCT/US08/88236, which corresponds to U.S. Appl. No. 12/082,203, 7 pgs (Olbrich).
International Search Report and Written Opinion dated Oct. 27, 2011, received in International Patent Application No. PCT/US2011/028637, which corresponds to U.S. Appl. No. 12/726,200, 11 pgs (Olbrich).
European Search Report dated Feb. 23, 2012, received in European Patent Application No. 08866997.3, which corresponds to U.S. Appl. No. 12/082,207, 6 pgs (Prins).
Office Action dated Apr. 18, 2012, received in Chinese Patent Application No. 200880127623.8, which correspinds to U.S. Appl. No. 12/082,207, 12 pgs (Prins).
Office Action dated Dec. 31, 2012, received in Chinese Patent Application No. 200880127623.8, which corresponds to U.S. Application No. 12/082,207, 9 pgs (Prins).
Notification of the Decision to Grant a Patent Right for Patent for Invention dated Jul. 4, 2013, received in Chinese Patent Application No. 200880127623.8, which corresponds to U.S. Appl. No. 12/082,207, 1 pg (Prins).
Office Action dated Jul. 24, 2012, received in Japenese Patent Application No. JP 2010-540863, 3 pgs (Prins).
International Search Report and Written Opinion dated Mar. 7, 2014, received in International Patent Application No. PCT/US2013/074772, which corresponds to U.S. Appl. No. 13/831,218, 10 pages (George).
International Search Report and Written Opinion dated Mar. 24, 2014, received in International Patent Application No. PCT/US2013/074777, which corresponds to U.S. Appl. No. 13/831,308, 10 pages (George).
International Search Report and Written Opinion dated Mar. 7, 2014, received in International Patent Application No. PCT/US2013/074779, which corresponds to U.S. Appl. No. 13/831,374, 8 pages (George).

International Search Report and Written Opinion dated Aug. 31, 2012, received in International Patent Application No. PCT/US2012/042764, which corresponds to U.S. Appl. No. 13/285,873, 12 pgs (Frayer).
International Search Report and Written Opinion dated Mar. 4, 2013, received in International Patent Application No. PCT/US2012/042771, which corresponds to U.S. Appl. No. 13/286,012, 14 pgs (Stonelake).
International Search Report and Written Opinion dated Sep. 26, 2012, received in International Patent Application No. 13/285,892, which corresponds to U.S. Appl. No. 13/285,892, 8 pgs (Weston-Lewis et al.).
International Search Report and Written Opinion dated Jun. 6, 2013, received in International Patent Application No. PCT/US2012/059447, which corresponds to U.S. Appl. No. 13/602,031, 12 pgs (Tai).
International Search Report and Written Opinion dated Jun. 6, 2013, received in International Patent Application No. PCT/US2012/059453, which corresponds to U.S. Appl. No. 13/602,039, 12 pgs (Frayer).
International Search Report and Written Opinion dated Feb. 14, 2013, received in International Patent Application No. PCT/US2012/059459, which corresponds to U.S. Appl. No. 13/602,047, 9 pgs (Tai).
International Search Report and Written Opinion dated May 23, 2013, received in International Patent Application No. PCT/US2012/065914, which corresponds to U.S. Appl. No. 13/679,963, 7 pgs (Frayer).
International Search Report and Written Opinion dated Apr. 5, 2013, received in International Patent Application No. PCT/US2012/065916, which corresponds to U.S. Appl. No. 13/679,969, 7 pgs (Frayer).
International Search Report and Written Opinion dated Jun. 17, 2013, received in International Patent Application No. PCT/US2012/065919, which corresponds to U.S. Appl. No. 13/679,970, 8 pgs (Frayer).
International Preliminary Report on Patentability dated Dec. 6, 2016, received in International Patent Application No. PCT/US2015/030850, which corresponds to U.S. Appl. No. 14/298,843, 8 pages (Ellis).
International Preliminary Report on Patentability dated Dec. 20, 2016, received in International Patent Application No. PCT/US2015/036807, which corresponds to U.S. Appl. No. 14/311,152, 6 pages (Higgins).
Office Action dated Jan. 11, 2017, received in Chinese Patent Application No. 201280066282.4, which corresponds to U.S. Appl. No. 13/602,047, 3 pages (Tai).
Office Action dated May 3, 2017, received in Chinese Patent Application No. 201480015991.9, which corresponds to U.S. Appl. No. 13/963,444, 2 pages (Frayer).
Office Action dated Dec. 8, 2014, received in Chinese Patent Application No. 201180021660.2, which corresponds to U.S. Appl. No. 12/726,200, 7 pages (Olbrich).
Office Action dated Jul. 31, 2015, received in Chinese Patent Application No. 201180021660.2, which corresponds to U.S. Appl. No. 12/726,200, 9 pages (Olbrich).
International Search Report and Written Opinion dated Jun. 30, 2015, received in International Patent Application No. PCT/US2015/023927, which corresponds to U.S. Appl. No. 14/454,687, 11 pages (Kadayam).
International Search Report and Written Opinion dated Jul. 23, 2015, received in International Patent Application No. PCT/US2015/030850, which corresponds to U.S. Appl. No. 14/298,843, 12 pages (Ellis).
International Search Report and Written Opinion dated Sep. 14, 2015, received in International Patent Application No. PCT/US2015/036807, which corresponds to U.S. Appl. No. 14/311,152, 9 pages (Higgins).
Office Action dated Apr. 25, 2016, received in Chinese Patent Application No. 201280066282.4, which corresponds to U.S. Appl. No. 13/602,047, 8 pages (Tai).
Gasior, "Gigabyte's i-Ram storage device, Ram disk without the fuss," The Tech Report, p. 1, Jan. 25, 2006, 5 pages.

(56) References Cited

OTHER PUBLICATIONS

Oestreicher et al., "Object Lifetimes in Java Card," 1999, USENIX, 10 pages.
International Preliminary Report on Patentability dated May 24, 2016, received in International Patent Application No. PCT/US2014/065987, which corresponds to U.S. Appl. No. 14/135,400, 9 pages (George).
IBM Research—Zurich, "The Fundamental Limit of Flash Random Write Performance: Understanding, Analysis and Performance Modeling," Mar. 31, 2010, pp. 1-15.
Bayer, "Prefix B-Trees", IP.com Journal, IP.com Inc., West Henrietta, NY, Mar. 30, 2007, 29 pages.
Bhattacharjee et al., "Efficient Index Compression in DB2 LUW", IBM Research Report, Jun. 23, 2009, http://domino.research.ibm.com/library/cyberdig.nsf/papers/40B2C45876D0D747852575E100620CE7/$File/rc24815.pdf, 13 pages.
Lee et al., "A Semi-Preemptive Garbage Collector for Solid State Drives," Apr. 2011, IEEE, pp. 12-21.
Oracle, "Oracle9i: Database Concepts", Jul. 2001, http://docs.oracle.com/cd/A91202_01/901_doc/server.901/a88856.pdf, 49 pages.
Office Action dated Feb. 17, 2015, received in Chinese Patent Application No. 201210334987.1, which corresponds to U.S. Appl. No. 12/082,207, 9 pages (Prins).
International Search Report and Written Opinion dated May 4, 2015, received in International Patent Application No. PCT/US2014/065987, which corresponds to U.S. Appl. No. 14/135,400, 12 pages (George).
International Search Report and Written Opinion dated Mar. 17, 2015, received in International Patent Application No. PCT/US2014/067467, which corresponds to U.S. Appl. No. 14/135,420, 13 pages (Lucas).
International Search Report and Written Opinion dated Apr. 20, 2015, received in International Patent Application No. PCT/US2014/063949, which corresponds to U.S. Appl. No. 14/135,433, 21 pages (Delpapa).
International Search Report and Written Opinion dated Jun. 8, 2015, received in International Patent Application No. PCT/US2015/018252, which corresponds to U.S. Appl. No. 14/339,072, 9 pages (Busch).
International Search Report and Written Opinion dated Jun. 2, 2015, received in International Patent Application No. PCT/US2015/018255, which corresponds to U.S. Appl. No. 14/336,967, 14 pages (Chander).
International Search Report and Written Opinion dated Jul. 25, 2014, received in International Patent Application No. PCT/US2014/029453, which corresponds to U.S. Appl. No. 13/963,444, 9 pages (Frayer).
Office Action dated May 4, 2018, received in Chinese Patent Application No. 201480067219.1, which corresponds to U.S. Appl. No. 14/137,440, 8 pages.
Ashkenazi et al., "Platform independent overall security architecture in multi-processor system-on-chip integrated circuits for use in mobile phones and handheld devices," ScienceDirect, Computers and Electrical Engineering 33 (2007) 18 pages.
Invitation to Pay Additional Fees dated Feb. 13, 2015, received in International Patent Application No. PCT/US2014/063949, which corresponds to U.S. Appl. No. 14/135,433, 6 pages (Delpapa).
International Search Report and Written Opinion dated Mar. 9, 2015, received in International Patent Application No. PCT/US2014/059747, which corresponds to U.S. Appl. No. 14/137,440, 9 pages (Fitzpatrick).
International Search Report and Written Opinion dated Jan. 21, 2015, received in International Application No. PCT/US2014/059748, which corresponds to U.S. Appl. No. 14/137,511, 13 pages (Dancho).
International Search Report and Written Opinion dated Feb. 18, 2015, received in international Application No. PCT/US20/41066921, which corresponds to U.S. Appl. No. 14/135,260, 13 pages (Fitzpatrick).

\* cited by examiner

IDENTIFICATION OF HOT REGIONS TO ENHANCE PERFORMANCE AND ENDURANCE OF A NON-VOLATILE STORAGE DEVICE

RELATED APPLICATION

This application claims priority to U.S. Provisional Patent Application Ser. No. 62/005,423, filed May 30, 2014, entitled "Identification of Hot Regions to Enhance Performance and Endurance of a Non-Volatile Storage Device," which is hereby incorporated by reference in its entirety.

TECHNICAL FIELD

The disclosed embodiments relate generally to memory systems, and in particular, to identification of hot regions to enhance performance and endurance of a non-volatile storage device.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information. Increases in storage density have been facilitated in various ways, including increasing the density of memory cells on a chip enabled by manufacturing developments, and transitioning from single-level flash memory cells to multi-level flash memory cells, so that two or more bits can be stored by each flash memory cell.

Since flash memory can only be programmed and erased a limited number of times, it is important to optimize memory management processes (e.g., garbage collection, wear leveling, caching, etc.) to enhance performance and endurance of memory devices.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to enable identification of hot regions to enhance performance and endurance of a non-volatile storage device. In one aspect, in accordance with a determination that a region is accessed more than a predetermined threshold number of times during a predetermined time period, the region is marked with a hot region indicator, and while the region is marked with a hot region indicator, each open block associated with the region is marked with a hot block indicator.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
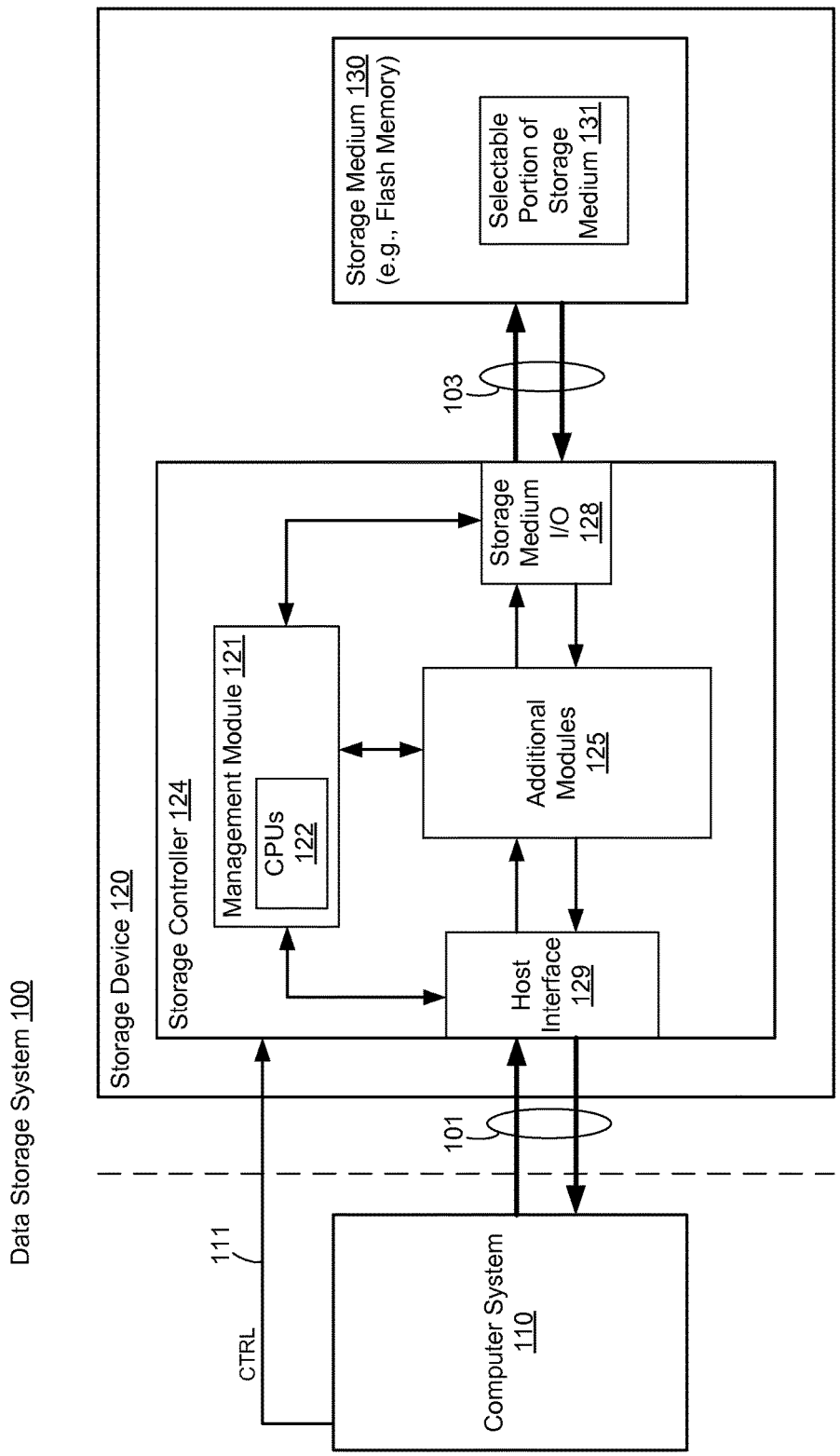
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to enable identification of hot regions to enhance performance and endurance of a non-volatile storage device. Some implementations include systems, methods and/or devices to, in accordance with a determination that a region is accessed more than a predetermined threshold number of times during a predetermined time period, mark the region with a hot region indicator, and while the region is marked with a hot region indicator, mark each open block associated with the region with a hot block indicator.

More specifically, some embodiments include a method. In some embodiments, the method includes: (1) receiving, at a storage device, a plurality of input/output (I/O) requests from a host, the plurality of I/O requests including read requests and write requests to be performed in a plurality of regions in a logical address space of the host, and (2) performing one or more operations for each region of the plurality of regions in the logical address space of the host, including (a) determining whether the region is accessed by the plurality of I/O requests more than a predetermined threshold number of times during a predetermined time period, (b) in accordance with a determination that the region is accessed more than the predetermined threshold number of times during the predetermined time period, marking the region with a hot region indicator, and (c) while the region is marked with the hot region indicator, identifying open blocks associated with the region, and marking each of the identified open blocks with a hot block indicator, wherein each block includes a plurality of pages and corresponds to a predefined range of physical addresses in a physical address space of the storage device.

In some embodiments, with respect to a region of the plurality of regions, determining whether the region is accessed more than the predetermined threshold number of times includes tracking whether a total number of write requests to the region has exceeded a write threshold.

In some embodiments, the predetermined threshold number of times is configurable.

In some embodiments, the predetermined time period is configurable.

In some embodiments, the method further includes (1) determining whether a subsequent write request from the host is to a region marked with the hot region indicator, (2) in accordance with a determination that the write request is to a region marked with the hot region indicator, storing data specified by the write request to an open block marked with the hot block indicator, and (3) in accordance with a determination that the write request is to a region not marked with the hot region indicator, storing data specified by the write request to an open block not marked with the hot block indicator.

In some embodiments, pages of a block storing data for one or more regions marked with the hot region indicator are invalidated faster than pages of a block storing data only for regions other than regions marked with the hot region indicator.

In some embodiments, blocks storing data for one or more regions marked with the hot region indicator are selected for garbage collection with higher probability than blocks storing data only for regions other than regions marked with the hot region indicator.

In some embodiments, the method further includes, for each region of the plurality of regions in the logical address space, storing information in a data structure to maintain a history of I/O request patterns in the region for the predetermined time period.

In some embodiments, the storage device comprises one or more flash memory devices.

In some embodiments, the storage device comprises one or more three-dimensional (3D) memory devices and circuitry associated with operation of memory elements in the one or more 3D memory devices.

In some embodiments, the circuitry and one or more memory elements in a respective 3D memory device, of the one or more 3D memory devices, are on the same substrate.

In another aspect, any of the methods described above are performed by a storage device, the storage device including (1) one or more processors, and (2) memory storing one or more programs, which when executed by the one or more processors cause the storage device to perform or control performance of any of the methods described herein.

In yet another aspect, any of the methods described above are performed by a storage device including means for performing any of the methods described herein.

In yet another aspect, any of the methods described above are performed by a storage system comprising (1) a storage medium (e.g., comprising one or more non-volatile storage devices, such as flash memory devices) (2) one or more processors, and (3) memory storing one or more programs, which when executed by the one or more processors cause the storage system to perform or control performance of any of the methods described herein.

In yet another aspect, some embodiments include a non-transitory computer readable storage medium, storing one or more programs configured for execution by one or more processors of a storage device, the one or more programs including instructions for performing any of the methods described herein.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram illustrating an implementation of data storage system 100, in accordance with some embodiments. While some example features are illustrated, various other features have not been illustrated for the sake of brevity and so as not to obscure more pertinent aspects of the example implementations disclosed herein. To that end, as a non-limiting example, data storage system 100 includes a storage device 120, which includes a storage controller 124 and a storage medium 130, and is used in conjunction with a computer system 110. In some implementations, storage medium 130 is a single flash memory device while in other implementations storage medium 130 includes a plurality of flash memory devices. In some implementations, storage medium 130 is NAND-type flash memory or NOR-type flash memory. In some implementations, storage medium 130 includes one or more three-dimensional (3D) memory devices, as further defined herein. Further, in some implementations storage controller 124 is a solid-state drive (SSD) controller. However, other types of storage media may be included in accordance with aspects of a wide variety of implementations.

Computer system 110 is coupled to storage controller 124 through data connections 101. However, in some implementations computer system 110 includes storage controller 124 as a component and/or a sub-system. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host or host system. In some implementations, computer system 110 includes one or more processors, one or more types of memory, a display and/or other user interface components such as a keyboard, a touch screen display, a mouse, a track-pad, a digital camera and/or any number of supplemental devices to add functionality.

Storage medium 130 is coupled to storage controller 124 through connections 103. Connections 103 are sometimes called data connections, but typically convey commands in addition to data, and optionally convey metadata, error correction information and/or other information in addition to data values to be stored in storage medium 130 and data values read from storage medium 130. In some implementations, however, storage controller 124 and storage medium 130 are included in the same device as components thereof. Furthermore, in some implementations storage controller 124 and storage medium 130 are embedded in a host device, such as a mobile device, tablet, other computer or computer controlled device, and the methods described herein are performed by the embedded memory controller. Storage medium 130 may include any number (i.e., one or more) of memory devices including, without limitation, non-volatile semiconductor memory devices, such as flash memory. For example, flash memory devices can be configured for enterprise storage suitable for applications such as cloud computing, or for caching data stored (or to be stored) in secondary storage, such as hard disk drives. Additionally and/or alternatively, flash memory can also be configured for relatively smaller-scale applications such as personal flash drives or hard-disk replacements for personal, laptop and tablet computers. In some embodiments, storage medium 130 includes one or more three-dimensional (3D) memory devices, as further defined herein.

Storage medium 130 is divided into a number of addressable and individually selectable blocks, such as selectable portion 131. In some implementations, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some implementations (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

For example, one block comprises any number of pages, for example, 64 pages, 128 pages, 256 pages or another suitable number of pages. Blocks are typically grouped into a plurality of zones. Each block zone can be independently managed to some extent, which increases the degree of parallelism for parallel operations and simplifies management of storage medium 130.

In some implementations, storage controller 124 includes a management module 121, a host interface 129, a storage medium interface (I/O) 128, and additional module(s) 125. Storage controller 124 may include various additional features that have not been illustrated for the sake of brevity and so as not to obscure more pertinent features of the example implementations disclosed herein, and a different arrangement of features may be possible. Host interface 129 provides an interface to computer system 110 through data connections 101. Similarly, storage medium I/O 128 provides an interface to storage medium 130 though connections 103. In some implementations, storage medium I/O 128 includes read and write circuitry, including circuitry capable of providing reading signals to storage medium 130 (e.g., reading threshold voltages for NAND-type flash memory).

In some implementations, management module 121 includes one or more processing units (CPUs, also sometimes called processors) 122 configured to execute instructions in one or more programs (e.g., in management module 121). In some implementations, the one or more CPUs 122 are shared by one or more components within, and in some cases, beyond the function of storage controller 124. Management module 121 is coupled to host interface 129, additional module(s) 125 and storage medium I/O 128 in order to coordinate the operation of these components.

Additional module(s) 125 are coupled to storage medium I/O 128, host interface 129, and management module 121. As an example, additional module(s) 125 may include an error control module to limit the number of uncorrectable errors inadvertently introduced into data during writes to memory or reads from memory. In some embodiments, additional module(s) 125 are executed in software by the one or more CPUs 122 of management module 121, and, in other embodiments, additional module(s) 125 are implemented in whole or in part using special purpose circuitry (e.g., to perform encoding and decoding functions).

During a write operation, host interface 129 receives data to be stored in storage medium 130 from computer system 110. The data held in host interface 129 is made available to an encoder (e.g., in additional module(s) 125), which encodes the data to produce one or more codewords. The one or more codewords are made available to storage medium I/O 128, which transfers the one or more codewords to storage medium 130 in a manner dependent on the type of storage medium being utilized.

A read operation is initiated when computer system (host) 110 sends one or more host read commands on control line 111 to storage controller 124 requesting data from storage medium 130. Storage controller 124 sends one or more read access commands to storage medium 130, via storage medium I/O 128, to obtain raw read data in accordance with memory locations (addresses) specified by the one or more host read commands. Storage medium I/O 128 provides the raw read data (e.g., comprising one or more codewords) to a decoder (e.g., in additional module(s) 125). If the decoding is successful, the decoded data is provided to host interface 129, where the decoded data is made available to computer system 110. In some implementations, if the decoding is not successful, storage controller 124 may resort to a number of remedial actions or provide an indication of an irresolvable error condition.

Flash memory devices utilize memory cells to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some implementations, during a read operation, a reading threshold voltage is applied to the control gate of the transistor and the resulting sensed current or voltage is mapped to a data value.

The terms "cell voltage" and "memory cell voltage," in the context of flash memory cells, means the threshold voltage of the memory cell, which is the minimum voltage that needs to be applied to the gate of the memory cell's transistor in order for the transistor to conduct current. Similarly, reading threshold voltages (sometimes also called reading signals, reading voltages, and/or read thresholds) applied to a flash memory cells are gate voltages applied to the gates of the flash memory cells to determine whether the memory cells conduct current at that gate voltage. In some implementations, when a flash memory cell's transistor conducts current at a given reading threshold voltage, indicating that the cell voltage is less than the reading threshold voltage, the raw data value for that read operation is a "1," and otherwise the raw data value is a "0."

As explained above, a storage medium (e.g., storage medium 130) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC)

NAND flash typically has four possible states per cell, yielding two bits of information per cell. Further, in some embodiments, a MLC NAND has two page types: (1) a lower page (sometimes called fast page), and (2) an upper page (sometimes called slow page).

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages with valid data in that block are read and re-written to a new block and the old block is erased (or put on a queue for erasing). This process is called garbage collection. After garbage collection, the new block contains pages with valid data and free pages that are available for new data to be written, and the old block that was erased is also available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., storage medium 130) is a multiple of the logical amount of data intended to be written by a host (e.g., computer system 110, sometimes called a host). As discussed above, when a storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation (1):

$$\frac{\text{amount of data written to a storage medium}}{\text{amount of data written by a host}} \qquad (1)$$

One of the goals of any storage system architecture is to reduce write amplification as much as possible so that available endurance is used to meet storage medium reliability and warranty specifications. Higher system endurance also results in lower cost as the storage system may need less over-provisioning. By reducing the write amplification, the endurance of the storage medium is increased and the overall cost of the storage system is decreased. Generally, garbage collection is performed on erase blocks with the fewest number of valid pages for best performance and best write amplification.

Figure 2A:
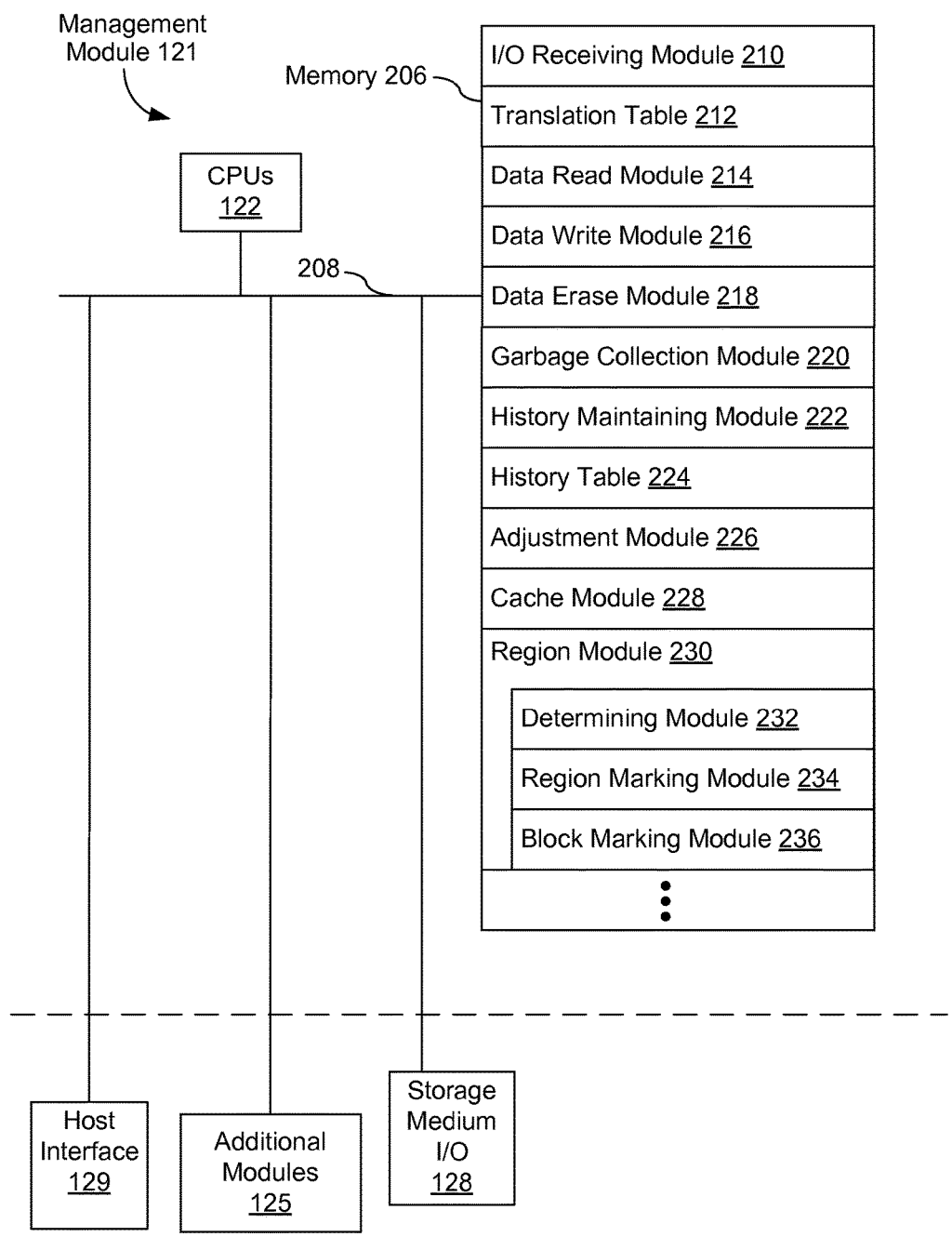
FIG. 2A is a block diagram illustrating an implementation of a management module, in accordance with some embodiments.
Figure 4:
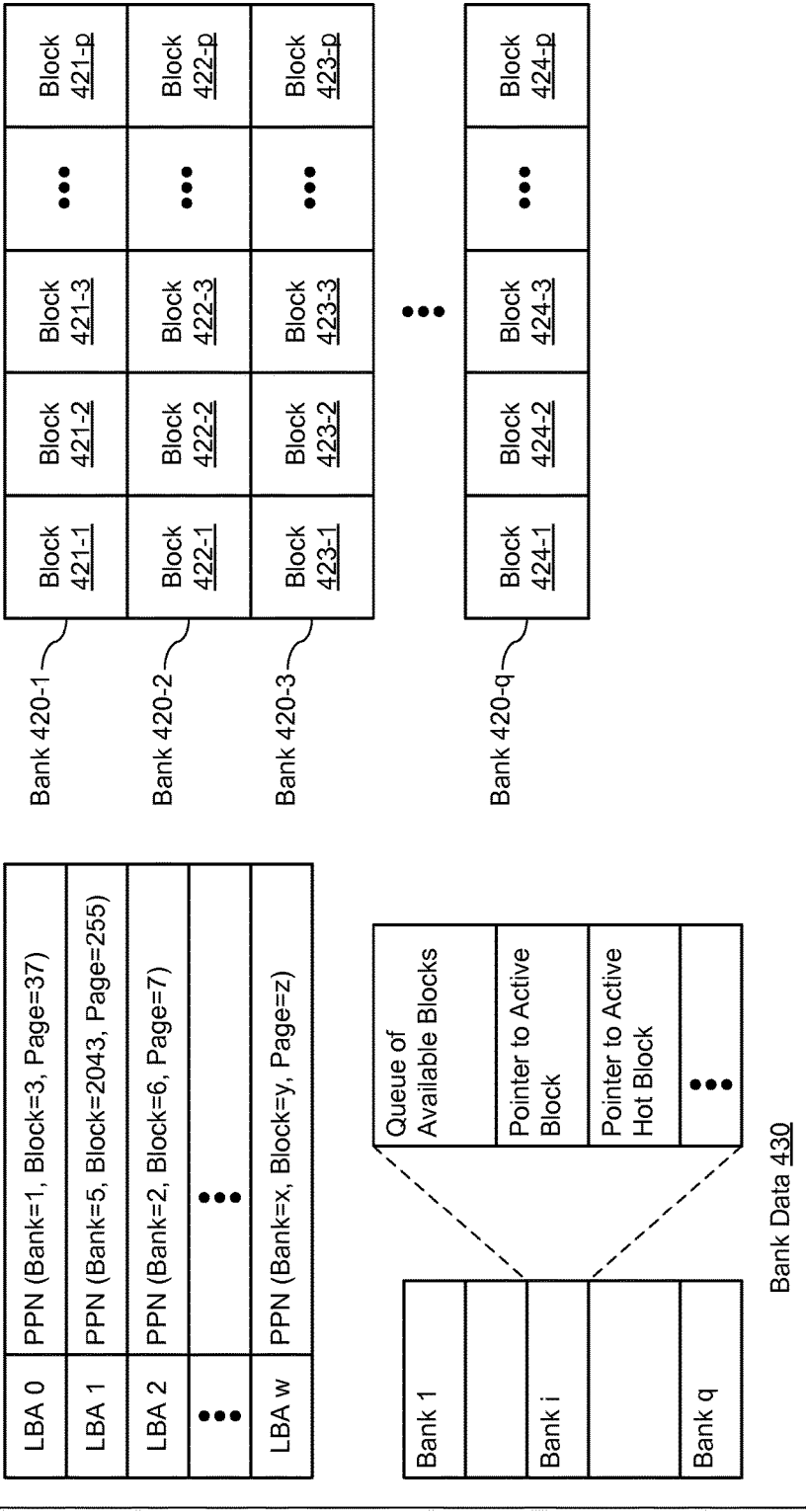
FIG. 4 is a block diagram of a forward mapping table, physical address space, and bank data, in accordance with some embodiments.

FIG. 2A is a block diagram illustrating an exemplary management module 121, in accordance with some embodiments. Management module 121 typically includes one or more processing units (CPUs) 122 for executing modules, programs and/or instructions stored in memory 206 and thereby performing processing operations, memory 206, and one or more communication buses 208 for interconnecting these components. Communication buses 208 optionally include circuitry (sometimes called a chipset) that interconnects and controls communications between system components. Management module 121 is coupled to host interface 129, additional module(s) 125, and storage medium I/O 128 by communication buses 208. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 122. Memory 206, or alternately the non-volatile memory device(s) within memory 206, comprises a non-transitory computer readable storage medium. In some embodiments, memory 206, or the computer readable storage medium of memory 206 stores the following programs, modules, and data structures, or a subset thereof:

I/O receiving module 210 that is used for receiving from a host a plurality of input/output (I/O) requests (e.g., read requests and/or write requests to be performed in a plurality of regions in a logical address space of the host);
  translation table 212 that is used for mapping logical addresses to physical addresses (e.g., in some embodiments, translation table 212 includes forward mapping table 402, FIG. 4);
  data read module 214 that is used for reading data from one or more blocks in a storage medium;
  data write module 216 that is used for writing data to one or more blocks in a storage medium;
  data erase module 218 that is used for erasing data from one or more blocks in a storage medium;
  garbage collection module 220 that is used for garbage collection for one or more blocks in a storage medium;
  history maintaining module 222 that is used for maintaining a history of I/O request patterns (e.g., one or more histories of I/O request patterns) in one or more regions of a plurality of regions in a logical address space of a host;
  history table 224 that includes a collection of data structures (e.g., region data structures 244, FIG. 2B), each data structure storing data for a respective region of a plurality of regions in a logical address space of a host;
  adjustment module 226 that is used for using the history of I/O request patterns in a respective region to adjust subsequent I/O processing in the respective region;
  cache module 228 that is used for caching data from one or more regions of a plurality of regions in a logical address space of a host; and
  region module 230 that is used for performing one or more operations for each region of the plurality of regions in the logical address space of the host, optionally including:
    determining module 232 that is used for determining whether the region is a hot region (e.g., whether the region is accessed by the plurality of I/O requests more than a predetermined threshold number of times during a predetermined time period);
    region marking module 234 that is used for marking, in accordance with a determination that the region is a hot region, the region with a hot region indicator; and
    block marking module 236 that is used for, while the region is marked with the hot region indicator, identifying open blocks associated with the region, and marking each of the identified open blocks with a hot block indicator, wherein each block includes a plurality of pages and corresponds to a predefined range of physical addresses in a physical address space of the storage device.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions for implementing any of the methods described below with reference to FIGS. 6A-6D.

Although FIG. 2A shows management module 121 in accordance with some embodiments, FIG. 2A is intended more as a functional description of the various features which may be present in management module 121 than as a structural schematic of the embodiments described herein. In practice, and as recognized by those of ordinary skill in the art, items shown separately could be combined and some items could be separated.

Figure 2B:
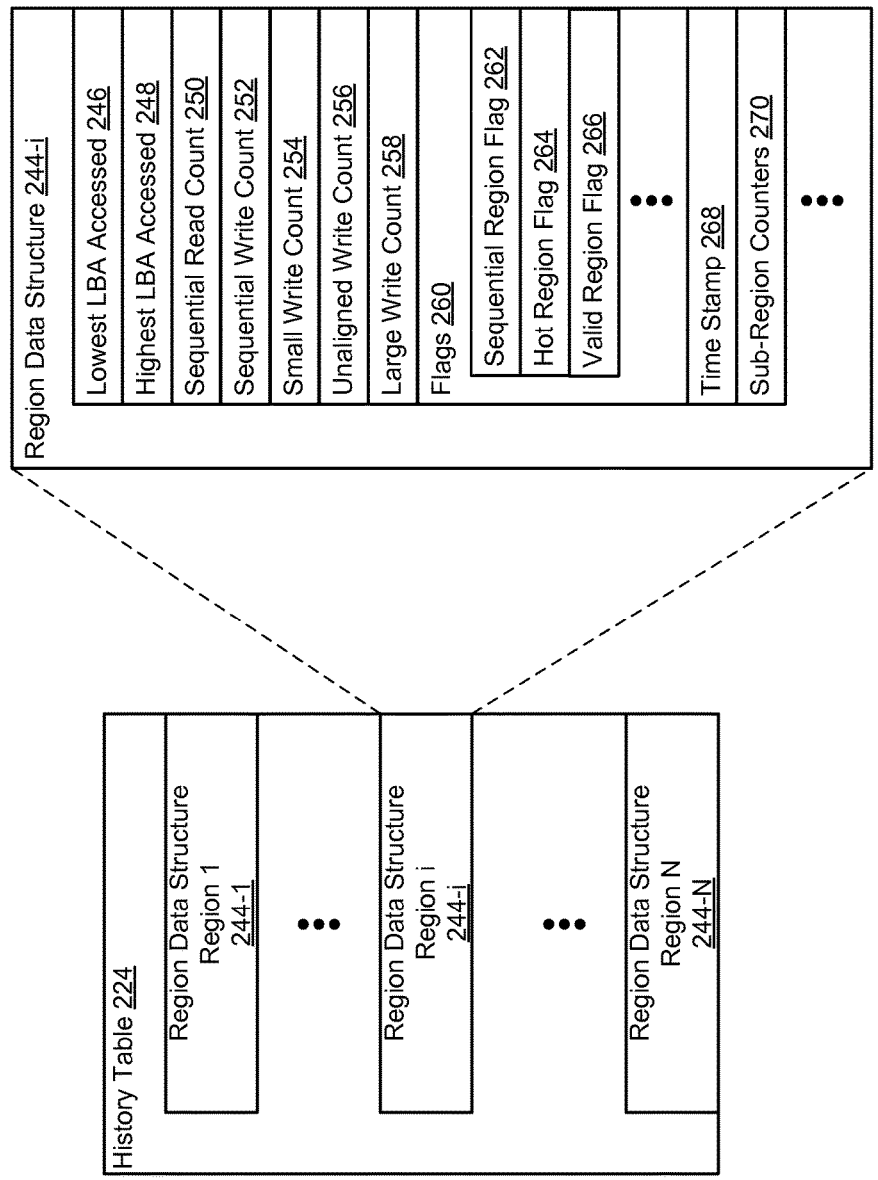
FIG. 2B is a block diagram illustrating an implementation of a history table included in FIG. 2A, in accordance with some embodiments.

FIG. 2B is a block diagram illustrating an implementation of a history table 224 included in FIG. 2A, in accordance with some embodiments. History table 224 includes a collection of region data structures 244, that each store data associated with a respective region of a plurality of regions in a logical address space of a host (e.g., a respective region 310-$i$ of a plurality of regions in a logical address space, FIG. 3). An example of a logical address space of a host is described in further detail below with respect to FIG. 3. In some embodiments, the data stored in region data structures 244 includes information regarding real-time history of I/O request patterns per region, for each region of a plurality of regions in a logical address space. For example, without limitation, in some embodiments in which a logical address space of a host (e.g., computer system 110, FIG. 1) includes a plurality of regions (e.g., region 310-1 through region 310-$m$, FIG. 3), history table 224 includes at least one region data structure for each region (e.g., region data structure 244-1 for region 310-1, region data structure 244-2 for region 310-2, etc.). In some embodiments, a history of I/O request patterns is maintained for only the regions that have some I/O activity during a predetermined time period. In some embodiments, a history of I/O request patterns is maintained for a subset of all the regions in a logical address space of a host. In some embodiments, a history of I/O request patterns is maintained for all of the regions in a logical address space of a host. In some embodiments, history table 224 is maintained in one or more data structures stored on a storage device (e.g., storage device 120, FIG. 1). In some embodiments, the storage device gathers data as I/O requests are processed and stores the history of I/O request patterns and/or determinations based on the history of I/O request patterns in history table 224. In some embodiments, history table 224 is maintained in one or more data structures stored on a host (e.g., computer system 110, FIG. 1). In some embodiments, the host gathers data as I/O requests are processed and stores the history of I/O request patterns and/or determinations based on the history of I/O request patterns in history table 224. In some embodiments, one or more operations performed to gather data and/or make determinations based on the data are performed at a host (e.g., computer system 110, FIG. 1), and relevant information is transmitted to a storage device (e.g., storage device 120, FIG. 1).

In some embodiments, each region data structure (e.g., region data structure 244-$i$) includes information regarding real-time history of I/O request patterns for a respective region, sometimes herein called a logical address region. For example, in some embodiments, region data structure 244-1 includes information regarding real-time history of I/O request patterns for region 1 of a plurality of regions, region data structure 244-2 includes information regarding real-time history of I/O request patterns for Region 2 of the plurality of regions, and so on. In some embodiments, the history of I/O request patterns is maintained for each region for a predetermined time period (e.g., one hour). In some embodiments, the predetermined time period is configurable. In some embodiments, after the predetermined time period, the history of I/O request patterns is reset (e.g., cleared). In some embodiments, one or more parameters of region data structure 244-$i$ are not reset until a later time. In some embodiments, some parameters of a data structure (e.g., region data structure 244-$i$) are reset (e.g., cleared) after the predetermined time period, while other parameters of the data structure are not reset until a later time. For example, in some embodiments, parameters tracking various count values (e.g., sequential read count 250, sequential write count 252, small write count 254, unaligned write count 256 and/or large write count 258) are reset after the predetermined time period, but if the respective region still meets certain criteria (e.g., if the respective region is still a hot region), other parameters of the data structure are not reset until a later time (e.g., hot region flag 264, FIG. 2B, is not reset until the region is no longer hot).

Region data structure 244-$i$ illustrates an implementation of a region data structure for a respective region (e.g., region i), in accordance with some embodiments. In some embodiments, region data structure 244-$i$ stores the following data (sometimes called history of I/O requests for a particular time period, for a particular region of the logical address space), or a subset or superset thereof:

lowest LBA accessed 246 that is used for tracking a lowest logical block address (LBA) accessed in the region;

highest LBA accessed 248 that is used for tracking a highest logical block address (LBA) accessed in the region;

sequential read count 250 that is used for tracking a total number of sequential read requests from the region;

sequential write count 252 that is used for tracking a total number of sequential write requests to the region;

small write count 254 that is used for tracking a total number of write requests to write data of size less than a predefined small-size threshold;

unaligned write count 256 that is used for tracking a total number of unaligned write requests to the region, wherein unaligned write requests are write requests not aligned with predefined page boundaries;

large write count 258 that is used for tracking a total number of write requests to write data of size greater than a predefined large-size threshold;

flags 260 that are used for tracking one or more determinations based on the history of I/O request patterns, including in some embodiments, one or more of:

sequential region flag 262 that is used for tracking whether a total number of sequential I/O requests to the region has exceeded a sequential request threshold;

hot region flag 264 that is used for tracking whether a total number of write requests to the region has exceeded a write threshold;

valid region flag 266 that is used for tracking whether the region is accessed at least once by a plurality of I/O requests;

optionally, one or more additional flags, each for tracking a corresponding determination based on the history of I/O request patterns;

time stamp 268 that is used for recording a time stamp corresponding to when the history of I/O request patterns is reset; and sub-region counters 270 that are used for tracking a total number of times each sub-region (of a plurality of sub-regions in the region) is accessed.

Figure 3:
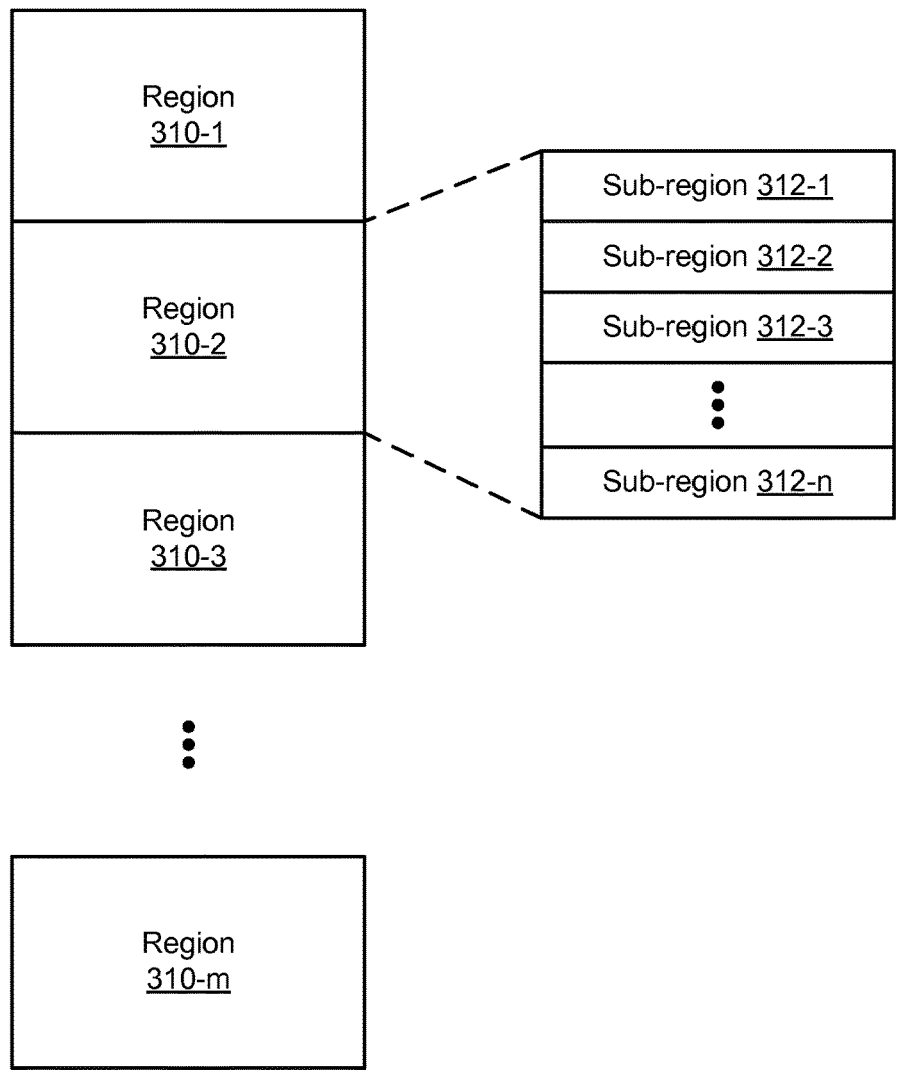
FIG. 3 is a block diagram of a plurality of regions in a logical address space of a host, in accordance with some embodiments.

FIG. 3 is a block diagram of a plurality of regions in a logical address space of a host, in accordance with some embodiments. In some embodiments, a logical address is the address at which an item (e.g., data stored on a memory cell) resides from the perspective of a host (e.g., computer system 110, FIG. 1). In some embodiments, a logical address differs from a physical address due to the operation of a mapping function or address translator (e.g., translation table 212, FIG. 2A, including forward mapping table 402, FIG. 4). In some embodiments, a logical block address (LBA) is mapped to a physical flash address (e.g., a physical page number (PPN), including a bank, block, and page), as described further with respect to FIG. 4.

In some embodiments, a logical address space includes a plurality of regions (e.g., region 310-1 through region 310-m), and each region includes a plurality of sub-regions (e.g., sub-region 312-1 through sub-region 312-n). In some embodiments, for example, if a storage device with an advertised capacity of 1 terabyte (TB) is divided into m regions, each region will be (1 TB)/m in size (e.g., if m=1024, each region will be (1 TB)/1024=1 gigabyte (GB) in size), and if each region is divided into n sub-regions, each sub-region will be ((1 TB)/m)/n in size (e.g., if m=1024 and n=1024, each sub-region will be ((1 TB)/1024)/1024=1 megabyte (MB) in size).

As described above with respect to FIG. 2B, in some embodiments, real-time history of I/O request patterns for a respective region is maintained for a plurality of regions in the logical address space. In some embodiments, the real-time history of I/O request patterns for a respective region (e.g., region i) is maintained in a region data structure (e.g., region data structure 244-i, FIG. 2B), which stores data corresponding to the history of I/O request patterns for the region and/or data corresponding to determinations made in accordance with the history of I/O request patterns for the region. For example, in some embodiments, real-time history of I/O request patterns for region 310-1 is maintained (e.g., in region data structure 244-1, FIG. 2B), and if a total number of write requests to region 310-1 has exceeded a write threshold during a predetermined time period, region 310-1 is marked with a hot region indicator (e.g., using hot region flag 264, FIG. 2B).

FIG. 4 is a block diagram of a forward mapping table 402, physical address space 410, and bank data 430, in accordance with some embodiments. In some embodiments, forward mapping table 402 is used to translate a logical block address (LBA) from the perspective of a host (e.g., computer system 110, FIG. 1) to a physical address in a physical address space (e.g., physical address space 410) of a storage device (e.g., storage device 120, FIG. 1). In some embodiments, an LBA is the smallest unit that is accessible by a host (e.g., 512 B). In some embodiments, LBAs are organized in numerical order in the logical address space. Using the example from FIG. 3, in some embodiments, where the logical address space includes a plurality of regions and each region is 1 GB in size, the LBAs in the first 1 GB of the logical address space are in a first region (e.g., region 310-1, FIG. 3), the LBAs in the second 1 GB of the logical address space are in a second region (e.g., region 310-2, FIG. 3), and so on.

In some embodiments, forward mapping table 402 is stored in memory associated with the storage device (e.g., in memory 206, as part of translation table 212, FIG. 2A). In some embodiments, a physical address is a physical page number (PPN), including a bank number, a block number, and a page number. In the example shown in FIG. 4, LBA 0 is mapped to bank 1 (e.g., Bank 420-1), block 3 (e.g., Block 421-3), page 37 (pages not shown in FIG. 4) of physical address space 410.

In some embodiments, bank data 430 includes information for each bank of physical address space 410 (e.g., bank 420-1 through 420-q). For example, in some embodiments, for bank i (e.g., bank 420-i), bank data 430 includes a queue of available blocks in bank i (e.g., for which to write data), a pointer to an active block in bank i (e.g., a block to which data from write requests is written), and a pointer to an active hot block in bank i (e.g., a block to which data from write requests to hot regions is written). For example, if a region (e.g., region 310-1, FIG. 3) is marked with a hot region indicator (e.g., using hot region flag 264, FIG. 2B), in some embodiments, subsequent write requests to that region are written to an active hot block. Conversely, if a region (e.g., region 310-1, FIG. 3) is not marked with a hot region indicator, in some embodiments, subsequent write requests to that region are written to an active block (sometimes referred to as an active "cold block," as opposed to an active hot block). Depending on how LBAs are mapped to banks in forward mapping table 402, each bank in physical address space 410 may need to store data specified by a write request to a region marked with a hot region indicator (sometimes referred to as a "hot region") and/or store data specified by a write request to a region not marked with a hot region indicator (sometimes referred to as a "cold region"). In some embodiments, if an LBA for a write request is from a hot region, the data specified by the write request is stored on the active hot block, and if the LBA for a write request is from a cold region, the data specified by the write request is stored on the active block (e.g., a cold block that is active). In this manner, data associated with hot regions are grouped together (e.g., on hot blocks) and data associated with cold regions are grouped together (e.g., on cold blocks).

Typically, data in hot regions are invalidated faster than data in cold regions, due to a higher frequency of updates to data in the hot regions than updates to data in the cold regions. For example, if certain popular files are accessed and edited frequently (e.g., if a user frequently accesses and edits certain documents), in some embodiments, the region of the logical address space in which those popular files reside are marked with a hot region indicator, if the region is accessed more than a predetermined threshold during a predefined period of time. In some embodiments, the LBAs of the hot region are mapped to blocks (and pages) in the physical address space (e.g., physical address space 410) of the storage device (e.g., storage device 120, FIG. 1) using a translation table (e.g., forward mapping table 402), and the open blocks associated with the hot region are marked with a hot block indicator. In some embodiments, for each bank of physical address space 410, bank data 430 includes a queue of hot blocks available for writing, with a pointer to the active hot block for storing data from write requests to a hot region. In some embodiments, for each bank of physical address space 410, bank data 430 includes a queue of cold blocks available for writing, with a pointer to the active cold block for storing data from write requests to a cold region. Since hot regions, by definition, are written to more frequently than cold regions, pages in the hot blocks are typically invalidated faster (i.e., more frequently, on average) than pages in the cold blocks. By grouping together data associated with hot regions in the hot blocks, hot blocks will typically have more invalid pages due to the frequent updating of data in the hot regions, resulting in fewer valid pages that need to be copied in a garbage collection operation. By grouping together data from cold regions in the cold blocks, cold blocks will typically have more valid pages, due to the lower frequency of updates in the cold regions than the hot regions, and will be less likely to be selected for garbage collection, reducing the movement of cold data to new blocks. This localization of writes from hot regions to hot blocks and localization of writes from cold regions to cold blocks reduces the number of blocks that require garbage collection and reduces the number of valid pages that need to be copied during garbage collection, thus reducing write amplification and improving endurance of the storage device.

Although the description herein uses examples in which regions are separated into two categories (e.g., hot or cold) and blocks are separated into two categories accordingly, those skilled in the art will appreciate that the embodiments described herein may be extended to more than two categories (e.g., three categories for regions and associated blocks, including hot, warm, and cold).

Figure 5:
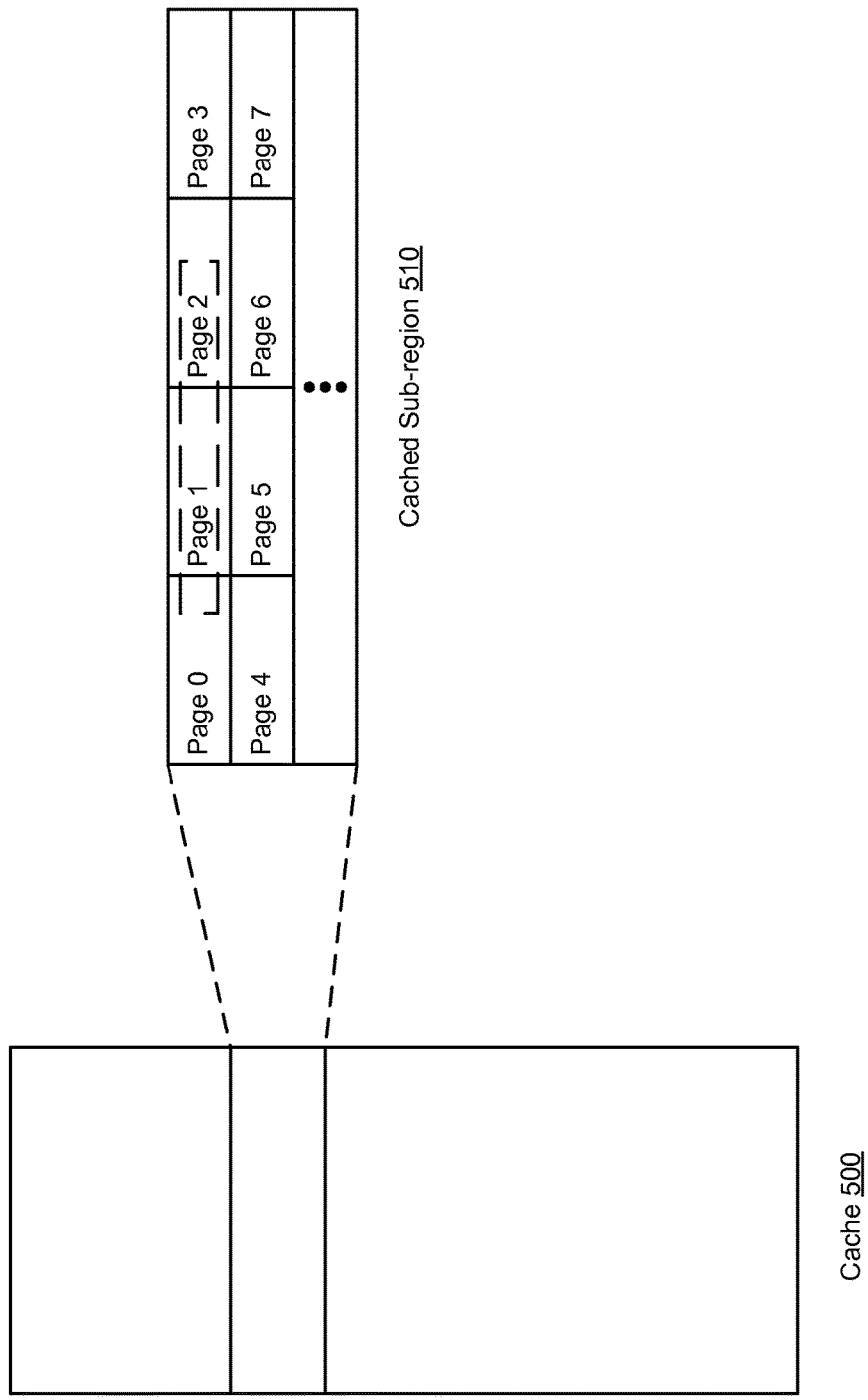
FIG. 5 is a block diagram of a cache with a cached sub-region, in accordance with some embodiments.
Figure 6A:
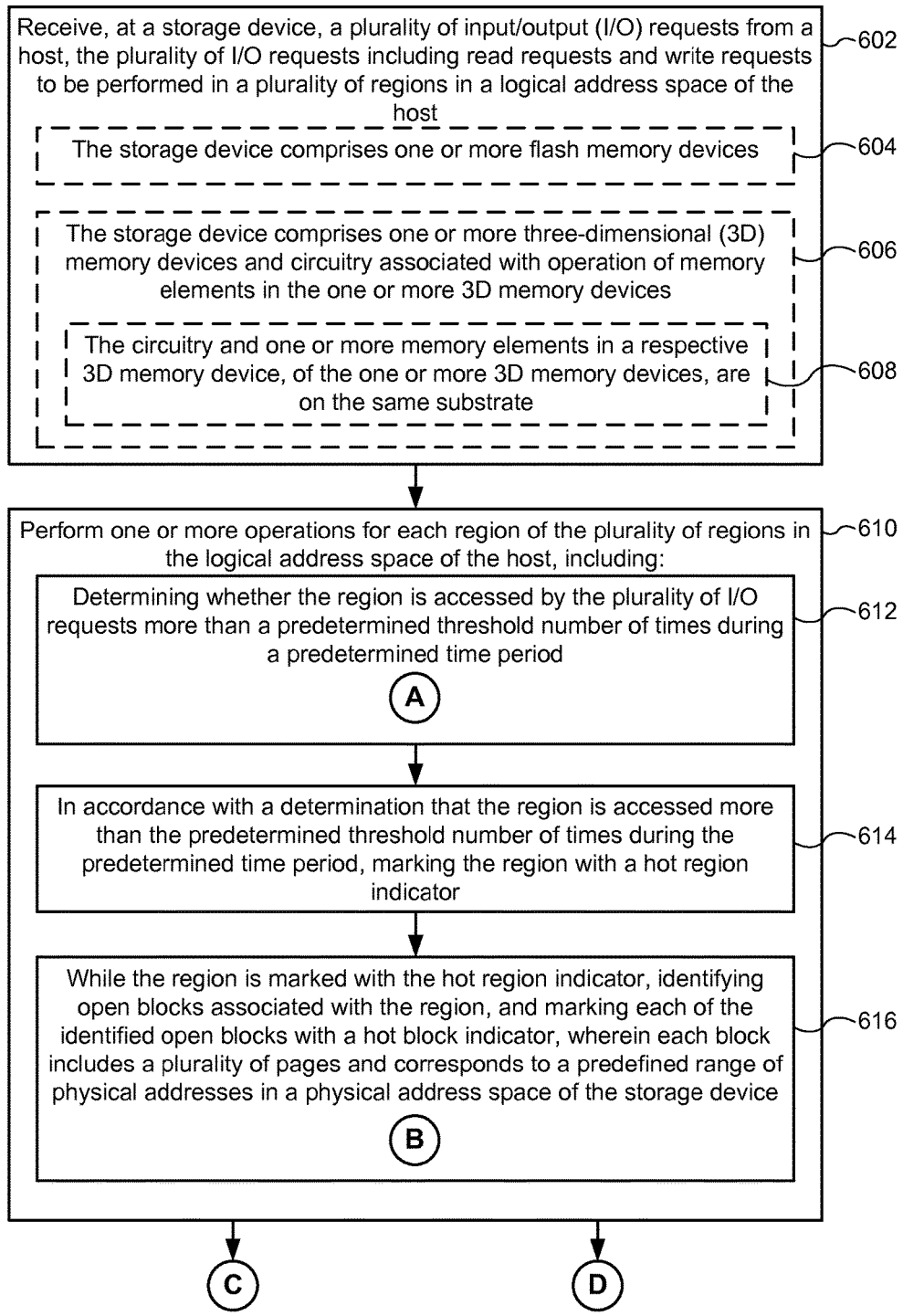
FIGS. 6A-6D illustrate a flowchart representation of a memory management method, in accordance with some embodiments.
Figure 6B:
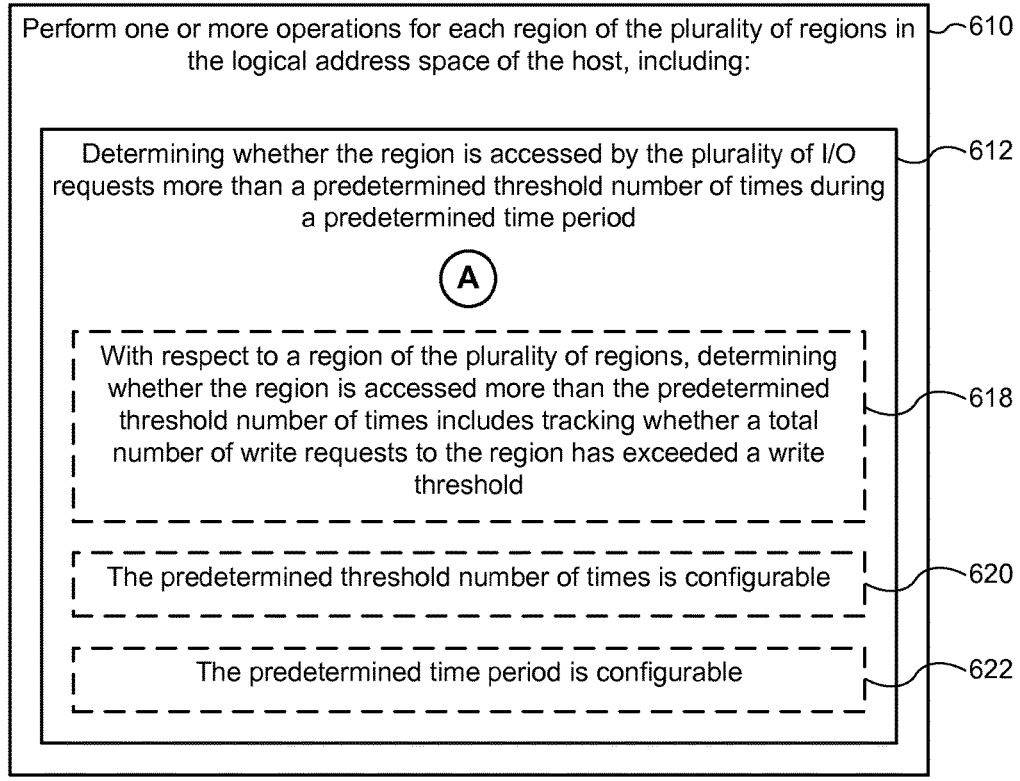
Figure 6C:
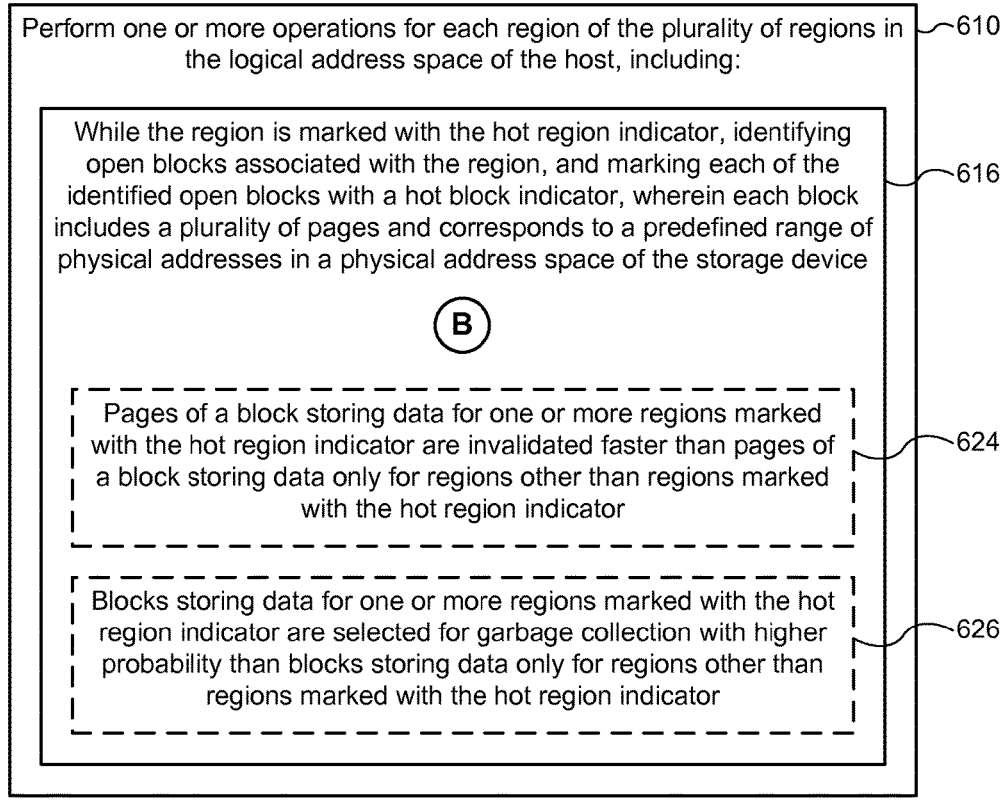
Figure 6D:
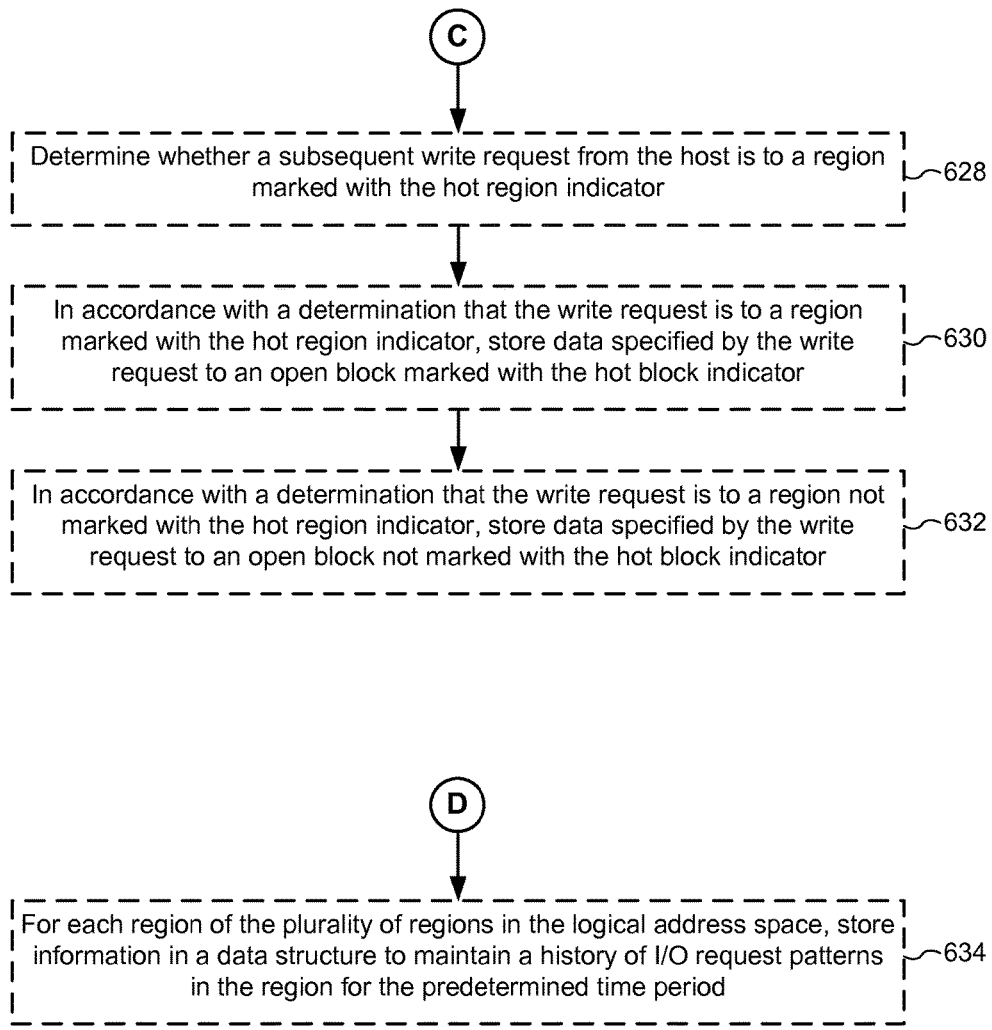

FIG. 5 is a block diagram of a cache 500 with a cached sub-region 510, in accordance with some embodiments. In some embodiments, cache 500 is included in a storage device (e.g., storage device 120, FIG. 1). In some embodiments, cache 500 is implemented in one or more volatile random access memory devices, such as, without limitation, DRAM or SRAM devices. In some embodiments, cache 500 is physically external to a storage device (e.g., external to storage device 120, FIG. 1). For example, in some embodiments, cache 500 is located in a DRAM device external to the storage device, where the DRAM device may be sized differently for different customers. In some other embodiments, cache 500 is physically part of the storage device.

In some embodiments, sub-regions that meet predefined criteria (e.g., sub-regions that are accessed more than a predetermined threshold number of times and/or sub-regions that have a history of unaligned write requests) are cached to cache 500. For example, in some embodiments, if a region (e.g., region 310-2, FIG. 3) has a history of unaligned write requests (e.g., determined from unaligned write count 256, FIG. 2B), where unaligned write requests are write requests not aligned with predefined page boundaries, a sub-region in that region (e.g., sub-region 312-3, FIG. 3) that is accessed more than a predetermined threshold number of times is cached to cache 500. In some embodiments, the predefined page boundaries are defined with respect to the logical address space of the host. In one example, in which L logical blocks (e.g., 8 blocks) are mapped to each physical page in storage medium 130, the predefined page boundaries are the logical addresses of the first (or last) location in each set of L logical blocks. Restated, in this example, the predefined page boundaries are logical addresses in the logical address space that are positive integer multiples of L*B, where B is the size of one logical block and L is the number of logical blocks mapped to each physical page in storage medium 130. In a more specific example, the predefined page boundaries are logical addresses that are positive integer multiples of 4 KB (i.e., 4098 bytes).

I/O alignment refers to whether the starting address of an I/O request is a multiple of the smallest unit size of a storage medium (e.g., aligned with a 4 KB page of a NAND flash memory device). For every misaligned write, the storage device must perform at least one read-modify-write operation on data stored in non-volatile memory. For example, an unaligned write request spanning pages 0 through 2 (depicted by the dotted box in cached sub-region 510) normally requires two read-modify-write operations on data stored in non-volatile memory, since the unaligned write request is only modifying a portion of page 0 and a portion of page 2. In some embodiments, since a program (e.g., write) operation is performed on an entire (erased) page, the storage device first reads page 0 to determine the portion of data that is not modified, modifies the portion of data that is affected by the unaligned write request, writes the data to a new page location, and invalidates page 0. A similar process is needed for page 2. However, in some embodiments, if sub-region 510 is cached, unaligned writes are processed in the cache, and may then be written to a storage medium (e.g., storage medium 130, FIG. 1) in a merged operation, thus reducing or avoiding read-modify-write operations on data stored in non-volatile memory.

FIGS. 6A-6D illustrate a flowchart representation of a memory management method 600, in accordance with some embodiments. At least in some embodiments, method 600 is performed by a storage device (e.g., storage device 120, FIG. 1) or one or more components of the storage device (e.g., storage controller 124 and/or storage medium 130, FIG. 1), wherein the storage device is operatively coupled with a host system (e.g., computer system 110, FIG. 1). In some embodiments, method 600 is governed by instructions that are stored in a non-transitory computer readable storage medium and that are executed by one or more processors of a device, such as the one or more processing units (CPUs) 122 of management module 121, shown in FIGS. 1 and 2A. In some embodiments, method 600 is performed by a storage system (e.g., data storage system 100, FIG. 1) or one or more components of the storage system (e.g., computer system 110 and/or storage device 120, FIG. 1). In some embodiments, some of the operations of method 600 are performed at a host (e.g., computer system 110, FIG. 1) and information is transmitted to a storage device (e.g., storage device 120, FIG. 1). In some embodiments, method 600 is governed, at least in part, by instructions that are stored in a non-transitory computer readable storage medium and that are executed by one or more processors of a host (not shown in FIG. 1). For ease of explanation, the following describes method 600 as performed by a storage device (e.g., storage device 120, FIG. 1). However, those skilled in the art will appreciate that in other embodiments, one or more of the operations described in method 600 are performed by a host (e.g., computer system 110, FIG. 1).

A storage device (e.g., storage device 120, FIG. 1) receives (602) a plurality of input/output (I/O) requests from a host (e.g., computer system 110, FIG. 1), the plurality of I/O requests including read requests and write requests to be performed in a plurality of regions in a logical address space of the host. In some embodiments, the I/O requests specify operations (sometimes called storage operations or memory operations) to be performed with respect to logical addresses in a plurality of regions in a logical address space of a host (e.g., regions 310, FIG. 3). In some embodiments, the plurality of I/O requests includes read requests from one or more regions of the plurality of regions and write requests to one or more regions of the plurality of regions. For example, in some embodiments, the plurality of I/O requests includes one or more read requests from one or more regions of the plurality of regions (e.g., regions 310, FIG. 3) and one or more write requests to one or more regions of the plurality of regions. In some embodiments, an I/O receiving module (e.g., I/O receiving module 210, FIG. 2A) is used to receive a plurality of input/output (I/O) requests from a host, the plurality of I/O requests including read requests and write requests to be performed in a plurality of regions in a logical address space of the host, as described above with respect to FIG. 2A.

In some embodiments, the storage device comprises (604) one or more flash memory devices. In some embodiments, the storage device comprises a storage medium (e.g., storage medium 130, FIG. 1), and the storage medium comprises one or more non-volatile storage devices, such as flash memory devices. In some embodiments, the storage medium (e.g., storage medium 130, FIG. 1) is a single flash memory device, while in other embodiments the storage medium includes a plurality of flash memory devices. For example, in some implementations, the storage medium includes dozens or hundreds of flash memory devices, organized in parallel memory channels, such as 16, 32 or 64 flash memory devices per memory channel, and 8, 16 or 32 parallel memory channels. In some embodiments, the non-volatile storage medium (e.g., storage medium 130, FIG. 1) includes NAND-type flash memory or NOR-type flash memory. In other embodiments, the storage medium comprises one or more other types of non-volatile storage devices.

In some embodiments, the storage device comprises (606) one or more three-dimensional (3D) memory devices, as further defined herein, and circuitry associated with operation of memory elements in the one or more 3D memory devices. In some embodiments, the storage device comprises a storage medium (e.g., storage medium 130, FIG. 1), and the storage medium comprises one or more 3D memory devices and circuitry associated with operation of memory elements in the one or more 3D memory devices. In some embodiments, the storage medium (e.g., storage medium 130, FIG. 1) is a single 3D memory device, while in other embodiments the storage medium includes a plurality of 3D memory devices.

In some embodiments, the circuitry and one or more memory elements in a respective 3D memory device, of the one or more 3D memory devices, are (608) on the same substrate (e.g., a silicon substrate). In some embodiments, the substrate is a wafer on which the material layers of the one or more memory elements are deposited and/or in which the one or more memory elements are formed. In some embodiments, the substrate is a carrier substrate which is attached to the one or more memory elements after they are formed. As a non-limiting example, in some embodiments, the substrate includes a semiconductor such as silicon.

The storage device performs (610) one or more operations for each region of the plurality of regions in the logical address space of the host, including: (1) determining (612) whether the region is accessed by the plurality of I/O requests more than a predetermined threshold number of times during a predetermined time period, (2) in accordance with a determination that the region is accessed more than the predetermined threshold number of times during the predetermined time period, marking (614) the region with a hot region indicator, and (3) while the region is marked with the hot region indicator, identifying (616) open blocks associated with the region, and marking each of the identified open blocks with a hot block indicator, wherein each block includes a plurality of pages and corresponds to a predefined range of physical addresses in a physical address space of the storage device. In some embodiments, the plurality of regions includes only regions that have some I/O activity during a predetermined time period. For example, in some embodiments, the one or more operations are performed only for regions that have I/O activity during a predetermined time period. Thus, in some embodiments, the plurality of regions is a subset of all the regions in the logical address space. For example, in some embodiments, the one or more operations are performed for a subset of all the regions in the logical address space (e.g., when only a subset of all the regions in the logical address space has I/O activity during the predetermined time period). In some embodiments, the plurality of regions is all of the regions in the logical address space. For example, in some embodiments, the one or more operations are performed for all of the regions in the logical address space. In some embodiments, a region module (e.g., region module 230, FIG. 2A), including an optional determining module (e.g., determining module 232, FIG. 2A), an optional region marking module (e.g., region marking module 234, FIG. 2A), and/or an optional block marking module (e.g., block marking module 236, FIG. 2A) are used to perform one or more operations for each region of the plurality of regions in the logical address space of the host, including: (1) determining whether the region is accessed by the plurality of I/O requests more than a predetermined threshold number of times during a predetermined time period, (2) in accordance with a determination that the region is accessed more than the predetermined threshold number of times during the predetermined time period, marking the region with a hot region indicator, and (3) while the region is marked with the hot region indicator, identifying open blocks associated with the region, and marking each of the identified open blocks with a hot block indicator, wherein each block includes a plurality of pages and corresponds to a predefined range of physical addresses in a physical address space of the storage device, as described above with respect to FIG. 2A.

In some embodiments, some (e.g., one, some, or all) of the operations performed for each region of the plurality of regions in the logical address space of the host are performed at the storage device (e.g., storage device 120, FIG. 1). In some embodiments, some (e.g., one, some, or all) of the operations performed for each region of the plurality of regions in the logical address space of the host are performed at the host (e.g., computer system 110, FIG. 1). In some embodiments, one or more of the operations are performed at the storage device (e.g., storage device 120, FIG. 1) and one or more of the operations are performed at the host (e.g., computer system 110, FIG. 1). For ease of explanation, the description herein describes embodiments wherein the one or more operations are performed at the storage device. However, in some embodiments, one or more of the operations are performed at the host and signals and/or commands are transmitted to the storage device as needed. For example, in some embodiments, maintaining a history of I/O request patterns in the region for a predetermined time period and/or making determinations based on the history of I/O request patterns (e.g., determining whether the region is accessed more than a predetermined threshold number of times during the predetermined time period) is performed at the host and one or more signals (e.g., a command, a flag, etc.) is transmitted by the host to the storage device to either adjust subsequent I/O processing in the region or to communicate to the storage device one or more aspects of the history of I/O request patterns in the region.

As noted above, the storage device determines (612) whether the region is accessed by the plurality of I/O requests more than a predetermined threshold number of times during a predetermined time period. In some embodiments, the plurality of I/O requests includes read requests from the region and write requests to the region. In some embodiments, determining whether the region is accessed by the plurality of I/O requests more than a predetermined threshold number of times during a predetermined time period is based on information stored (e.g., data gathered regarding the plurality of I/O requests) in a data structure (e.g., region data structure 244-i, FIG. 2B) for maintaining a history of I/O request patterns in the region for the predetermined time period. In some embodiments, a determining module (determining module 232, FIG. 2A) is used to determine whether the region is accessed by the plurality of I/O requests more than a predetermined threshold number of times during a predetermined time period, as described above with respect to FIG. 2A.

In some embodiments, with respect to a region of the plurality of regions, determining whether the region is accessed more than the predetermined threshold number of times includes tracking (618) whether a total number of write requests to the region has exceeded a write threshold during the aforementioned time period. In some embodiments, tracking whether a total number of write requests to the region has exceeded a write threshold includes recording updated values for the total number of write requests to the region. For example, in some embodiments, tracking whether a total number of write requests to region 310-1 (FIG. 3) has exceeded a write threshold includes recording updated values for the total number of write requests to region 310-1 (e.g., in region data structure 244-1, FIG. 2B). In some embodiments, the total number of write requests to the region is tracked and/or recorded using a parameter stored in a data structure (e.g., region data structure 244-1, FIG. 2B). In some embodiments, a determination of whether a total number of write requests to the region has exceeded a write threshold is tracked and/or recorded using a parameter stored in a data structure (e.g., using hot region flag 264 in region data structure 244-i, FIG. 2B).

In some embodiments, the predetermined threshold number of times is (620) configurable. For example, in some embodiments, the predetermined threshold number of times is configurable during initialization of the storage device (e.g., storage device 120, FIG. 1). As another example, in some embodiments, the predetermined threshold number of times is configurable during each power cycle of the storage device. In some embodiments, the predetermined threshold number of times is configurable using a configuration parameter. In some embodiments, the predetermined threshold number of times is configured to be a fixed number.

In some embodiments, the predetermined time period is (622) configurable. For example, in some embodiments, the predetermined time period is configurable during initialization of the storage device (e.g., storage device 120, FIG. 1). As another example, in some embodiments, the predetermined time period is configurable during each power cycle of the storage device. In some embodiments, the predetermined time period is configured based on how long the history of I/O request patterns is to be maintained before resetting (e.g., clearing) the history (e.g., in region data structure 244-i, FIG. 2B). In some embodiments, some parameters of a data structure (e.g., region data structure 244-i, FIG. 2B) are reset (e.g., cleared) after the predetermined time period, while other parameters of the data structure are not reset until a later time. For example, in some embodiments, flags 260 are re-evaluated and set accordingly at the end of each predetermined time period based on the count values at the end of the predetermined time period, and parameters tracking various count values (e.g., sequential read count 250, sequential write count 252, small write count 254, unaligned write count 256 and/or large write count 258, FIG. 2B) are reset after the predetermined time period. Thus, if (i.e., in accordance with a determination that) the respective region still meets certain criteria (e.g., if the respective region is still a hot region), one or more other parameters (e.g., one or more respective flags 260) of the data structure are not reset until a later time (e.g., hot region flag 264, FIG. 2B, is not reset until the region is no longer hot). As a result, the respective time period used to determine whether to adjust a particular type of I/O operation may encompass both the prior predetermined time period (e.g., a one hour time period preceding the current one hour time period) and the current predetermined time period. In one example that uses one hour time periods as the predetermined time period, a respective logical address region is determined to be a hot region part-way through a one hour time period. As a result, the respective hot region flag for that logical address region remains set both during the remainder of the one hour time period, and also through the next one hour time period (at which point it would be re-evaluated based on activity during that next one hour time period).

As noted above, the storage device, in accordance with a determination that the region is accessed more than the predetermined threshold number of times during the predetermined time period, marks (614) the region with a hot region indicator. In some embodiments, marking the region with a hot region indicator includes storing a flag (e.g., hot region flag 264, FIG. 2B) or other marker for the region. In some embodiments, marking the region with a hot region indicator includes setting the flag to "true" or "1" (as opposed to "false" or "0"). For example, in some embodiments, in accordance with a determination that region 310-1 (FIG. 3) is accessed more than the predetermined threshold number of times during the predetermined time period, the storage device marks region 310-1 with a hot region indicator by setting the hot region flag 264 (FIG. 2B) to "1" in the region data structure associated with region 310-1 (e.g., region data structure 244-1, FIG. 2B). In some embodiments, a region marking module (e.g., region marking module 234, FIG. 2A) is used to mark, in accordance with a determination that the region is accessed more than the predetermined threshold number of times during the predetermined time period, the region with a hot region indicator, as described above with respect to FIG. 2A.

As noted above, the storage device, while the region is marked with the hot region indicator, identifies (616) open blocks associated with the region, and marks each of the identified open blocks with a hot block indicator. Each block includes a plurality of pages and corresponds to a predefined range of physical addresses in a physical address space of the storage device. In some embodiments, identifying open blocks associated with the region includes identifying open blocks associated with the region using a mapping table (e.g., forward mapping table 402, FIG. 4). For example, if LBA 0, LBA 1, and LBA 2 of FIG. 4 are in a first region (e.g., region 310-1, FIG. 3) that is marked with the hot region indicator, the storage device identifies block 3 (of bank 1), block 2043 (of bank 5), and block 6 (of bank 2) as associated with the region, and if all three blocks are open (e.g., not full and thus, available for writing new data), block 3, block 2043, and block 6 are marked with a hot block indicator. In some embodiments, blocks that are associated with the hot region, but that are not open, are not marked with a hot block indicator since those blocks are full and thus, not available for writing new data. Using the previous example, in some embodiments, if block 2043 is full, only block 3 and block 6 are marked with a hot block indicator. In some embodiments, marking each of the identified open blocks with a hot block indicator includes storing a flag or other marker associated with the respective block. In some embodiments, marking each of the identified open blocks with a hot block indicator includes storing a list of open blocks associated with the region. In some embodiments, while the region is marked with the hot region indicator, a block marking module (e.g., block marking module 236, FIG. 2A) is used to identify open blocks associated with the region, and mark each of the identified open blocks with a hot block indicator. As described above with respect to FIG. 2A, each block includes a plurality of pages and corresponds to a predefined range of physical addresses in a physical address space of the storage device.

In some embodiments, pages of a block storing data for one or more regions marked with the hot region indicator are (624) invalidated faster than pages of a block storing data only for regions other than regions marked with the hot region indicator. As discussed above with respect to FIG. 4, typically, data in hot regions are invalidated faster than data in cold regions, due to a higher frequency of updates to data in the hot regions than data in the cold regions. Since hot regions, by definition, are written to more frequently than cold regions, pages in the hot blocks are typically invalidated faster (i.e., more frequently, on average) than pages in the cold blocks.

In some embodiments, blocks storing data for one or more regions marked with the hot region indicator (e.g., hot blocks) are (626) selected for garbage collection with higher probability than blocks storing data only for regions other than regions marked with the hot region indicator (e.g., cold blocks). As discussed above with respect to FIG. 4, by grouping together data associated with hot regions in the hot blocks, hot blocks will typically have more invalid pages due to the frequent updating of data in the hot regions, and since generally, garbage collection is performed on blocks with the fewest number of valid pages (e.g., higher number of invalid pages) for best performance, in some embodiments, hot blocks are selected for garbage collection with higher probability than cold blocks.

In some embodiments, the storage device determines (628) whether a subsequent write request from the host is to a region marked with the hot region indicator (e.g., a hot region). For example, if a subsequent write request is to LBA 3 of region 310-1 (FIG. 3), the storage device determines whether region 310-1 is marked with the hot region indicator. In some embodiments, the storage device uses a history table (e.g., history table 224, FIG. 2A) to determine whether a subsequent write request from the host is to a region marked with the hot region indicator, as described above with respect to FIGS. 2A and 2B.

In some embodiments, the storage device, in accordance with a determination that the write request is to a region marked with the hot region indicator (e.g., to a hot region), stores (630) data specified by the write request to an open block marked with the hot block indicator (e.g., to a hot block). Using the above example, in accordance with a determination that the write request to LBA 3 is to a hot region, the storage device stores data specified by the write request to an open block marked with the hot region indicator (e.g., to an active hot block specified by bank data 430). In some embodiments, data write module 216 (FIG. 2A) determines the bank(s) and block(s) to which to write data specified by a write command received from a host system.

In some embodiments, when a current open block marked with the hot block indicator (e.g., an active hot block) is filled, a new block is opened and marked with the hot block indicator (and becomes the new active hot block), as defined above. In some embodiments, when a current open block marked with the hot block indicator (e.g., an active hot block) is filled, another block that is already marked with the hot block indicator becomes the new active hot block. In some embodiments, a data write module (e.g., data write module 216, FIG. 2A), in accordance with a determination that the write request is to a region marked with the hot region indicator, stores data specified by the write request to an open block marked with the hot block indicator, as described above with respect to FIG. 2A.

In some embodiments, the storage device, in accordance with a determination that the write request is to a region not marked with the hot region indicator (e.g., to a cold region), stores (632) data specified by the write request to an open block not marked with the hot block indicator (e.g., to a cold block). For example, if a subsequent write request to specified LBA is to a cold region, the storage device stores data specified by the write request to an open block not marked with the hot block indicator (e.g., to an active block specified by bank data 430). In some embodiments, when a current open block not marked with the hot block indicator (e.g., an active block) is filled, a new block is opened (which is not marked with the hot block indicator) and becomes the new active block. In some embodiments, a data write module (e.g., data write module 216, FIG. 2A), in accordance with a determination that the write request is to a region not marked with the hot region indicator, stores data specified by the write request to an open block not marked with the hot block indicator, as described above with respect to FIG. 2A.

In some embodiments, the storage device, for each region of the plurality of regions in the logical address space, stores (634) information (e.g., data gathered regarding the plurality of I/O requests) in a data structure (e.g., history table 224, FIG. 2A) to maintain a history of I/O request patterns in the region for the predetermined time period. For example, in some embodiments, the storage device stores information in region data structure 244-1 (FIG. 2B) to maintain a history of I/O request patterns in region 310-1 (FIG. 3) for the predetermined time period. In some embodiments, maintaining a history of I/O request patterns in the region for the predetermined time period includes gathering the historical data as I/O requests are received and/or processed. For example, in some embodiments, maintaining a history of I/O request patterns in region 310-1 (FIG. 3) includes gathering the historical data as read requests from and write requests to region 310-1 are received and/or processed. In some embodiments, the information is stored in a data structure stored on the storage device (e.g., storage device 120, FIG. 1). For example, in some embodiments, the history of I/O request patterns is maintained in a history table (e.g., history table 224, FIGS. 2A and 2B) stored on the storage device (e.g., in memory 206 of management module 121 of storage controller 124 of storage device 120, FIG. 1). In some embodiments, the storage device gathers data as I/O requests are processed and stores the history of I/O request patterns and/or determinations based on the history of I/O request patterns in a history table (e.g., history table 224, FIGS. 2A and 2B) stored on the storage device. In some embodiments, the history table includes one or more data structures. In some embodiments, one or more operations performed to gather data and/or make determinations based on the data are performed at a host (e.g., computer system 110, FIG. 1), relevant information is transmitted from the host to a storage device (e.g., storage device 120, FIG. 1), and the history of I/O request patterns is maintained in a data structure on the storage device. In some embodiments, the information is stored in a data structure stored on the host (e.g., computer system 110, FIG. 1). For example, in some embodiments, the history of I/O request patterns is maintained in a history table stored on the host. In some embodiments, the host gathers data as I/O requests are processed and stores the history of I/O request patterns and/or determinations based on the history of I/O request patterns in a history table stored on the host. In some embodiments, the history table includes one or more data structures. In some embodiments, a history maintaining module (e.g., history maintaining module 222, FIG. 2A) is used to store information in a data structure to maintain a history of I/O request patterns in the region for the predetermined time period, as described above with respect to FIG. 2A.

In some embodiments, any of the methods described above are performed by a storage device, the storage device including (1) one or more processors, and (2) memory storing one or more programs, which when executed by the one or more processors cause the storage device to perform or control performance of any of the methods described herein.

In some embodiments, any of the methods described above are performed by a storage system comprising (1) a storage medium (e.g., comprising one or more non-volatile storage devices, such as flash memory devices) (2) one or more processors, and (3) memory storing one or more programs, which when executed by the one or more processors cause the storage system to perform or control performance of any of the methods described herein.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible (e.g., a NOR memory array). NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration (e.g., in an x-z plane), resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

The term "three-dimensional memory device" (or 3D memory device) is herein defined to mean a memory device having multiple memory layers or multiple levels (e.g., sometimes called multiple memory device levels) of memory elements, including any of the following: a memory device having a monolithic or non-monolithic 3D memory array, some non-limiting examples of which are described above; or two or more 2D and/or 3D memory devices, packaged together to form a stacked-chip memory device, some non-limiting examples of which are described above.

One of skill in the art will recognize that this invention is not limited to the two dimensional and three dimensional exemplary structures described but cover all relevant memory structures within the spirit and scope of the invention as described herein and as understood by one of skill in the art.

It will be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method, comprising:
   receiving, at a storage device, a plurality of input/output (I/O) requests from a host, the plurality of I/O requests including read requests and write requests to be performed in a plurality of regions in a logical address space of the host; and
   performing one or more operations for each region of the plurality of regions in the logical address space of the host, wherein each region includes two or more logical block addresses (LBAs), including:
     determining whether the region in the logical address space of the host is accessed by the plurality of I/O requests more than a predetermined threshold number of times during a predetermined time period;
     in accordance with a determination that the region in the logical address space of the host is accessed more than the predetermined threshold number of times during the predetermined time period, marking the region in the logical address space of the host with a hot region indicator; and
     while the region in the logical address space of the host is marked with the hot region indicator,
       identifying open physical blocks, comprising physical blocks, to which logical addresses in the region are mapped using a logical address to physical address mapping, that are not full and that are available for storing additional data while retaining data already stored therein; and
       based on the identifying of open physical blocks to which logical addresses in the region are mapped, marking each of the identified open physical blocks with a hot block indicator, wherein the hot block indicator for a respective open physical block is distinct from the hot region indicator for the region in the logical address space of the host, and each block of the identified open physical blocks includes a plurality of pages and corresponds to a predefined range of physical addresses in a physical address space of the storage device;

wherein at least one region marked with the hot region indicator includes one or more logical addresses mapped to a physical block that is not open, and one or more logical addresses mapped to a physical block that is open.

2. The method of claim 1, wherein, with respect to a region of the plurality of regions, determining whether the region is accessed more than the predetermined threshold number of times includes tracking whether a total number of write requests to the region has exceeded a write threshold.

3. The method of claim 1, wherein the predetermined threshold number of times is configurable.

4. The method of claim 1, wherein the predetermined time period is configurable.

5. The method of claim 1, further comprising:
receiving, at the storage device, a subsequent write request from the host, the subsequent write request received subsequent to the plurality of I/O requests;
determining whether the subsequent write request from the host is to a region marked with the hot region indicator;
in accordance with a determination that the subsequent write request is to a region marked with the hot region indicator, storing data specified by the subsequent write request to an open physical block marked with the hot block indicator; and
in accordance with a determination that the subsequent write request is to a region not marked with the hot region indicator, storing data specified by the subsequent write request to an open physical block not marked with the hot block indicator.

6. The method of claim 1, wherein pages of a block storing data for one or more regions marked with the hot region indicator are invalidated faster than pages of a block storing data only for regions other than regions marked with the hot region indicator.

7. The method of claim 1, wherein blocks storing data for one or more regions marked with the hot region indicator are selected for garbage collection with higher probability than blocks storing data only for regions other than regions marked with the hot region indicator.

8. The method of claim 1, further comprising, for each region of the plurality of regions in the logical address space, storing information in a data structure to maintain a history of I/O request patterns in the region for the predetermined time period.

9. The method of claim 1, wherein the storage device comprises one or more flash memory devices.

10. The method of claim 1, wherein the storage device comprises one or more three-dimensional (3D) memory devices and circuitry associated with operation of memory elements in the one or more 3D memory devices.

11. The method of claim 10, wherein the circuitry and one or more memory elements in a respective 3D memory device, of the one or more 3D memory devices, are on the same substrate.

12. A storage device, comprising:
one or more processors; and
memory storing one or more programs, which when executed by the one or more processors cause the storage device to:
receive, at the storage device, a plurality of input/output (I/O) requests from a host, the plurality of I/O requests including read requests and write requests to be performed in a plurality of regions in a logical address space of the host; and
perform one or more operations for each region of the plurality of regions in the logical address space of the host, wherein each region includes two or more logical block addresses (LBAs), including:
determining whether the region in the logical address space of the host is accessed by the plurality of I/O requests more than a predetermined threshold number of times during a predetermined time period;
in accordance with a determination that the region in the logical address space of the host is accessed more than the predetermined threshold number of times during the predetermined time period, marking the region in the logical address space of the host with a hot region indicator; and
while the region in the logical address space of the host is marked with the hot region indicator,
identifying open physical blocks, comprising physical blocks, to which logical addresses in the region are mapped using a logical address to physical address mapping, that are not full and that are available for storing additional data while retaining data already stored therein; and
based on the identifying of open physical blocks to which logical addresses in the region are mapped, marking each of the identified open physical blocks with a hot block indicator, wherein the hot block indicator for a respective open physical block is distinct from the hot region indicator for the region in the logical address space of the host, and each block of the identified open physical blocks includes a plurality of pages and corresponds to a predefined range of physical addresses in a physical address space of the storage device;

wherein at least one region marked with the hot region indicator includes one or more logical addresses mapped to a physical block that is not open, and one or more logical addresses mapped to a physical block that is open.

13. The storage device of claim 12, wherein the one or more programs, which when executed by the one or more processors, further cause the storage device to:
receive, at the storage device, a subsequent write request from the host, the subsequent write request received subsequent to the plurality of I/O requests;
determine whether the subsequent write request from the host is to a region marked with the hot region indicator;
in accordance with a determination that the subsequent write request is to a region marked with the hot region indicator, store data specified by the subsequent write request to an open physical block marked with the hot block indicator; and
in accordance with a determination that the subsequent write request is to a region not marked with the hot region indicator, store data specified by the subsequent write request to an open physical block not marked with the hot block indicator.

14. The storage device of claim 12, wherein pages of a block storing data for one or more regions marked with the hot region indicator are invalidated faster than pages of a block storing data only for regions other than regions marked with the hot region indicator.

15. The storage device of claim 12, wherein blocks storing data for one or more regions marked with the hot region indicator are selected for garbage collection with higher probability than blocks storing data only for regions other than regions marked with the hot region indicator.

16. The storage device of claim 12, wherein the one or more programs, which when executed by the one or more processors, further cause the storage device to:
for each region of the plurality of regions in the logical address space, store information in a data structure to maintain a history of I/O request patterns in the region for the predetermined time period.

17. A storage system, comprising:
a storage medium;
one or more processors; and
memory storing one or more programs, which when executed by the one or more processors cause the storage system to:
receive, at a storage device, a plurality of input/output (I/O) requests from a host, the plurality of I/O requests including read requests and write requests to be performed in the plurality of regions in the logical address space of the host; and
perform one or more operations for each region of the plurality of regions in the logical address space of the host, wherein each region includes two or more logical block addresses (LBAs), including:
determining whether the region in the logical address space of the host is accessed by the plurality of I/O requests more than a predetermined threshold number of times during a predetermined time period;
in accordance with a determination that the region in the logical address space of the host is accessed more than the predetermined threshold number of times during the predetermined time period, marking the region in the logical address space of the host with a hot region indicator; and
while the region in the logical address space of the host is marked with the hot region indicator,
identifying open physical blocks, comprising physical blocks, to which logical addresses in the region are mapped using a logical address to physical address mapping, that are not full and that are available for storing additional data while retaining data already stored therein; and
based on the identifying of open physical blocks to which logical addresses in the region are mapped, marking each of the identified open physical blocks with a hot block indicator, wherein the hot block indicator for a respective open physical block is distinct from the hot region indicator for the region in the logical address space of the host, and each block of the identified open physical blocks includes a plurality of pages and corresponds to a predefined range of physical addresses in a physical address space of the storage device;
wherein at least one region marked with the hot region indicator includes one or more logical addresses mapped to a physical block that is not open, and one or more logical addresses mapped to a physical block that is open.

18. A non-transitory computer readable storage medium, storing one or more programs configured for execution by one or more processors of a storage device, the one or more programs including instructions for:
receiving, at a storage device, a plurality of input/output (I/O) requests from a host, the plurality of I/O requests including read requests and write requests to be performed in a plurality of regions in a logical address space of the host; and
performing one or more operations for each region of the plurality of regions in the logical address space of the host, wherein each region includes two or more logical block addresses (LBAs), including:
determining whether the region in the logical address space of the host is accessed by the plurality of I/O requests more than a predetermined threshold number of times during a predetermined time period;
in accordance with a determination that the region in the logical address space of the host is accessed more than the predetermined threshold number of times during the predetermined time period, marking the region in the logical address space of the host with a hot region indicator; and
while the region in the logical address space of the host is marked with the hot region indicator,
identifying open physical blocks, comprising physical blocks, to which logical addresses in the region are mapped using a logical address to physical address mapping, that are not full and that are available for storing additional data while retaining data already stored therein; and
based on the identifying of open physical blocks to which logical addresses in the region are mapped, marking each of the identified open physical blocks with a hot block indicator, wherein the hot block indicator for a respective open physical block is distinct from the hot region indicator for the region in the logical address space of the host, and each block of the identified open physical blocks includes a plurality of pages and corresponds to a predefined range of physical addresses in a physical address space of the storage device;
wherein at least one region marked with the hot region indicator includes one or more logical addresses mapped to a physical block that is not open, and one or more logical addresses mapped to a physical block that is open.

19. The non-transitory computer readable storage medium of claim 18, wherein the one or more programs further include instructions for:
receiving, at the storage device, a subsequent write request from the host, the subsequent write request received subsequent to the plurality of I/O requests;
determining whether the subsequent write request from the host is to a region marked with the hot region indicator;
in accordance with a determination that the subsequent write request is to a region marked with the hot region indicator, storing data specified by the subsequent write request to an open physical block marked with the hot block indicator; and
in accordance with a determination that the subsequent write request is to a region not marked with the hot region indicator, storing data specified by the subsequent write request to an open physical block not marked with the hot block indicator.

20. The non-transitory computer readable storage medium of claim 18, wherein pages of a block storing data for one or more regions marked with the hot region indicator are invalidated faster than pages of a block storing data only for regions other than regions marked with the hot region indicator.

21. The non-transitory computer readable storage medium of claim 18, wherein blocks storing data for one or more regions marked with the hot region indicator are selected for garbage collection with higher probability than blocks storing data only for regions other than regions marked with the hot region indicator.

22. The non-transitory computer readable storage medium of claim 18, wherein the one or more programs further include instructions for:
   for each region of the plurality of regions in the logical address space, storing information in a data structure to maintain a history of I/O request patterns in the region for the predetermined time period.

\* \* \* \* \*